US011437801B1

United States Patent
Bell et al.

(12) United States Patent
(10) Patent No.: US 11,437,801 B1
(45) Date of Patent: Sep. 6, 2022

(54) LOW-PIM MULTI-FUNCTION MOUNTING SYSTEM

(71) Applicant: ConcealFab Corporation, Colorado Springs, CO (US)

(72) Inventors: Thomas Bell, Colorado Springs, CO (US); Steve Rogers, Colorado Springs, CO (US); Jacob Lovelady, Colorado Springs, CO (US)

(73) Assignee: ConcealFab, Inc., Colorado Springs, CO (US)

( * ) Notice: Subject to any disclaimer, the term of this patent is extended or adjusted under 35 U.S.C. 154(b) by 0 days.

(21) Appl. No.: 17/669,418

(22) Filed: Feb. 11, 2022

Related U.S. Application Data

(60) Provisional application No. 63/149,416, filed on Feb. 15, 2021.

(51) Int. Cl.
*H02G 3/32* (2006.01)
*H02G 3/00* (2006.01)

(52) U.S. Cl.
CPC ............... *H02G 3/32* (2013.01); *H02G 3/263* (2013.01)

(58) Field of Classification Search
CPC ................................ H02G 3/32; H02G 3/263
See application file for complete search history.

(56) References Cited

U.S. PATENT DOCUMENTS 2,663,531 A 12/1952 Rubano
3,012,750 A 12/1961 Schermerhorn
4,595,185 A 6/1986 Kitagawa
4,784,552 A 11/1988 Rebentisch et al.
5,193,774 A * 3/1993 Rogers .................... H02B 5/02 248/219.4
5,794,897 A 8/1998 Johnson et al.
6,354,543 B1 3/2002 Paske
6,443,402 B1 9/2002 Ferrill et al.
6,502,796 B1 1/2003 Wales
6,622,976 B1 9/2003 Ianello
(Continued)

OTHER PUBLICATIONS

PCT/US22/16048 International Search Report, dated May 3, 3033 (ConcealFab. Corp.).
(Continued)

*Primary Examiner* — Eret C McNichols
(74) *Attorney, Agent, or Firm* — Mehrman Law Office; Michael J. Mehrman

(57) ABSTRACT

A low-PIM mounting system using cable ties or pipe clamps to alternatively secure cables and other items to poles having different diameters or flanges having different gauges at base station antenna sites. A first dual-interface mounting block includes a pole adapter, a flange adapter, and a cable hanger receptacle. A second dual-interface mounting block includes a pole adapter, a flange adapter, and a rod receptacle. A third dual-interface mounting block includes a pole adapter, a flange adapter, and a pilot hole receptacle for a self-tapping screw. A multi-function mounting block includes a mounting plate, a pole adapter, a flange adapter, cable hanger receptacles, and a rod receptacle. Each multi-function mounting system is fabricated from a low-PIM polymeric material and configured to alternatively secure cables and other items to poles of different diameters or flanges of different gauges using one or more low-PIM cable ties or pipe clamp.

20 Claims, 21 Drawing Sheets

(56) References Cited

U.S. PATENT DOCUMENTS 6,899,305 B2 3/2005 Korczak et al.
7,090,174 B2 8/2006 Korzak
7,293,745 B2 11/2007 Catapano
8,011,621 B2 9/2011 Korczak
8,191,836 B2 6/2012 Korzak
8,439,316 B2 5/2013 Feige
9,086,175 B2 7/2015 Feige
9,219,461 B2 12/2015 Zimmerman
9,853,434 B2 12/2017 Vaccaro
9,866,004 B2 1/2018 Vaccaro
9,903,510 B2 2/2018 Joshi et al.
9,995,414 B2 6/2018 Joshi et al.
10,158,218 B2 12/2018 Vaccaro et al.
10,243,339 B2 3/2019 Vaccaro et al.
10,253,906 B2 4/2019 Vaccaro
10,422,446 B2 9/2019 Joshi et al.
D890,182 S * 7/2020 Bell ........................ G09F 17/00 D8/356
10,724,655 B2 * 7/2020 Bell ...................... F16L 3/1222
10,851,916 B2 * 12/2020 Vaccaro ................ F16B 21/088
11,067,201 B2 * 7/2021 Varale ..................... F16L 3/221
11,081,786 B2 * 8/2021 Bell ....................... H05K 7/186
11,133,658 B2 * 9/2021 Leng ........................ H02G 3/32
11,326,666 B2 * 5/2022 Bell ........................ F16G 11/12
2002/0005463 A1 1/2002 Paske et al.
2002/0066833 A1 6/2002 Ferrill et al.
2005/0023421 A1 2/2005 Wood et al.
2008/0012785 A1 1/2008 Maxwell
2009/0146029 A1 * 6/2009 Beatty ..................... G09F 17/00 248/206.5
2009/0294602 A1 12/2009 Korczak
2010/0096511 A1 * 4/2010 Olver ....................... H02G 3/32 248/65
2011/0186693 A1 8/2011 McMiles et al.
2011/0226913 A1 9/2011 Feige
2012/0292460 A1 11/2012 Hsu
2013/0098674 A1 4/2013 Shoemaker et al.
2014/0086704 A1 3/2014 Hemingway et al.
2017/0122460 A1 5/2017 Joshi et al.
2018/0138678 A1 5/2018 Vacarro et al.
2018/0152253 A1 5/2018 Bell et al.
2019/0003616 A1 1/2019 Wargo
2019/0383426 A1 12/2019 Vacarro et al.
2019/0390797 A1 * 12/2019 Bell ...................... F16L 3/1222
2020/0185899 A1 * 6/2020 Leng ......................... F16L 3/13
2020/0321678 A1 10/2020 Renilson et al.

OTHER PUBLICATIONS

SitePro1 a Valmont Company (website), https://www.sitepro 1 .com/store/cart. ph p?m=product_list&c= 1, Oct. 21, 2006.

Petrilla Technologies, LLC (website), https://petrillatechnologies.com/support-accessories.html, Mar. 24, 2017.

CommScope (website), https://www.commscope.com/catalog/tools_accessories/product.aspx?id=46, Oct. 28, 2012.

Fimo, "Product Data Sheet, BAP 10, Plastic Socle for BFI 10 Threaded Bars" Apr. 13, 2016 (and associated photograph).

* cited by examiner

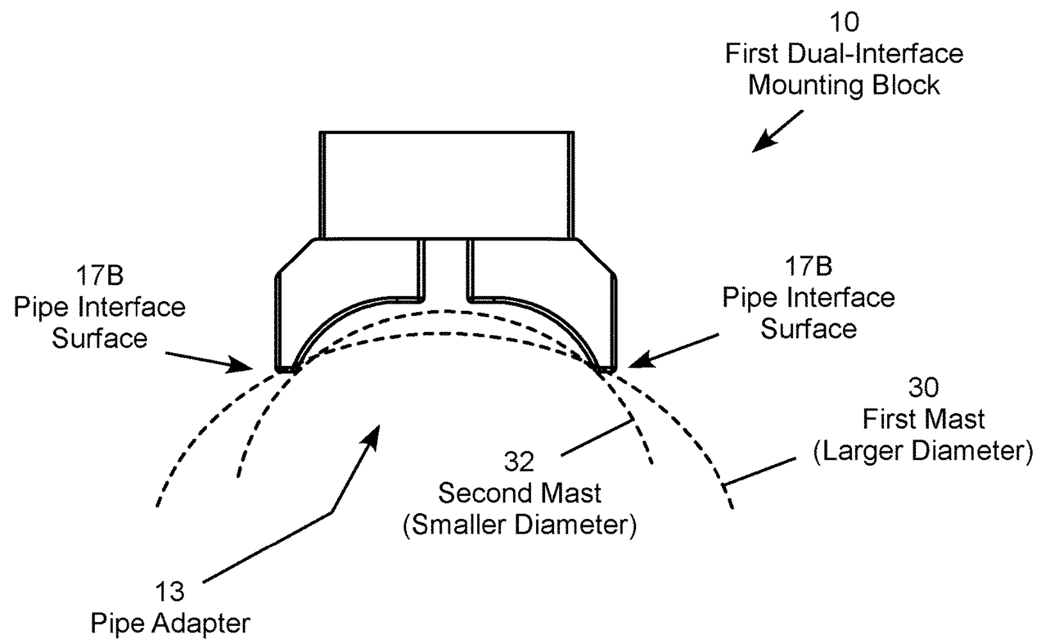
*FIG. 3*
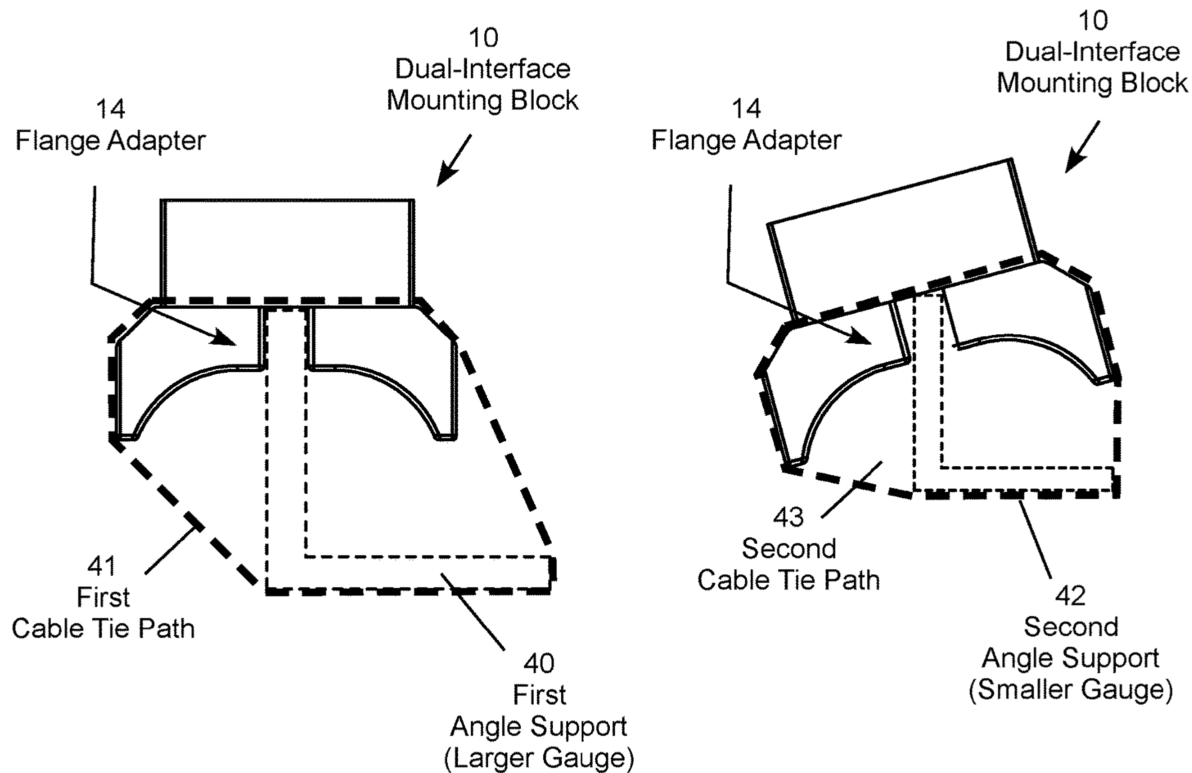
*FIG. 4A*
*FIG. 4B*

LOW-PIM MULTI-FUNCTION MOUNTING SYSTEM

REFERENCE TO RELATED APPLICATIONS

This application claims priority to U.S. Provisional Patent Application Ser. No. 63/149,416 filed Feb. 15, 2021, which is incorporated by reference.

TECHNICAL FIELD

The present invention is directed to cellular communication systems and, more particularly, to a low-PIM multi-function mounting system for using cable ties or pipe clamps to alternatively secure cables and other items to poles having different diameters or flanges having different gauges at base station antenna sites.

BACKGROUND

An essential element of modern mobile communications systems is the "cell site." The cell site includes one or more cellular base station antennas aimed at a desired geographical area of coverage with coaxial cables connecting the antennas to base station radio equipment. The performance of a cell site is often limited by passive intermodulation ("PIM") interference. PIM interference occurs when the high-power downlink signals (the "main beam") transmitted by the base station antenna mixes at passive, non-linear junctions in the RF path, creating new signals. When these new signals (intermodulation products) fall in an antenna's uplink band, they act as interference and reduce the signal-to-interference-plus-noise ratio ("SINR"). As the SINR reduces, the geographic coverage of the cell site reduces and the data capacity of that cell site reduces.

It is well documented that loosely touching metal-to-metal surfaces can behave in a non-linear fashion and become sources of passive intermodulation when illuminated by high power RF signals. Recently, it has been determined that loose metal-to-metal connections located behind base station antennas are also able to generate high levels of passive intermodulation. Even though this region is well outside the main beam of the antenna, enough RF energy is present in this region to excite non-linear objects and generate PIM.

Metal brackets and associated hardware for supporting RF, optical, ground and remote electrical tilt ("RET") cable are common sources of loose metal-to-metal contact found in the region behind and close to base station antennas. These cables are secured by cable hangers spaced along their length to the antenna support frame to prevent the cables from moving in the wind. Antenna support frames are often constructed using structural steel angle and pipe supports and metal cable hangers are often used to secure the cables to the frame.

If sufficient torque is not applied to the cable hanger mounting hardware, PIM can be generated at the bracket to support frame interface as well as bracket-to-bracket interfaces. Due to the high clamping force required to secure these brackets, the brackets often break through the galvanized coating on the antenna support frame creating areas of exposed steel. These exposed steel locations can become corroded or rusty over time creating sources of PIM. In addition, due to the large number of mounting brackets on a typical installation, the possibility exists for one bracket to loosely touch another, creating yet another source of PIM.

In addition to being potential sources of PIM, existing cable hanger mounting hardware are predominantly "single-function" in nature, meaning they are optimized for a single structural member shape. Installation crews deploying RF equipment at cell sites typically do not know the number and type of cable supports needed until they are on the site. If they plan incorrectly, time will be wasted getting the correct hardware to the site.

A need therefore exists for a low PIM mounting system for cables and other items with the flexibility to be readily adapted to wider range of support configurations.

SUMMARY

The needs described above are met by a low-PIM mounting system including a low-PIM mounting block formed of a polymeric material configured for attachment to a variety of support structures by one or more low-PIM cable ties or pipe clamps. The mounting block includes an anchor block having a receptacle for removably attaching another item to the anchor block, a dual-adapter base integrally formed with the anchor block, and one or more cable tie slots for attaching the mounting block to a support structure with cable ties or pipe clamps. The dual-adapter base includes a pole adapter for removably attaching the dual-adapter base to poles having different diameters. The dual-adapter base also includes a flange adapter for removably attaching the dual-adapter base to flanges having different gauges.

The pole adapter may include a pair of spaced-apart pole interface surfaces. The flange adapter may include a pair of slots positioned between pole interface surfaces. In alternative embodiments, the anchor block includes a cable hanger receptacle, a rod receptacle, or a pilot hole receptacle. In another alternative embodiment, the anchor block includes a flat mounting plate, which may include a pair of cable hanger receptacles, a rod receptacle, and a pair of cable tie slots.

It will be understood that specific embodiments may include a variety of features in different combinations, as desired by different users. The specific techniques and systems for implementing particular embodiments of the invention and accomplishing the associated advantages will become apparent from the following detailed description of the embodiments and the appended drawings and claims.

BRIEF DESCRIPTION OF THE FIGURES

The numerous advantages of the embodiments of the invention may be better understood with reference to the accompanying figures.

FIG. 3 is a side view of the first dual-interface mounting block interfacing with masts of different diameters.

FIG. 4A is a side view of the first dual-interface mounting block interfacing with a flange having a first gauge illustrating a first cable tie path.

FIG. 4B is a side view of the first dual-interface mounting block interfacing with a flange having a second gauge illustrating a second cable tie path.

DETAILED DESCRIPTION

Embodiments of the invention may be embodied in a low-PIM mounting system using cable ties or pipe clamps to alternatively secure cables and other items to poles or flanges at base station antenna sites. A first dual-interface mounting block includes a pole adapter, a flange adapter, and a cable hanger receptacle. A second dual-interface mounting block includes a pole adapter, a flange adapter, and a rod receptacle. A third dual-interface mounting block includes a pole adapter, a flange adapter, and a pilot hole receptacle for a self-tapping screw. A multi-function mounting block includes a mounting plate, a pole adapter, a flange adapter, a rod receptacle, and a cable hanger receptacle. Each low-PIM mounting system is fabricated from a low-PIM polymeric material and configured to alternatively secure cables and other items to poles of different diameters or flanges of different gauges using one or more cable ties or pipe clamps.

The versatility of the system allows a technician to carry a smaller assortment of hardware for connecting cables and other items to different types of support structures, such as masts, angle bars, flat bars and other flanges, in various configurations at cellular base station antenna sites.

Figure 1:
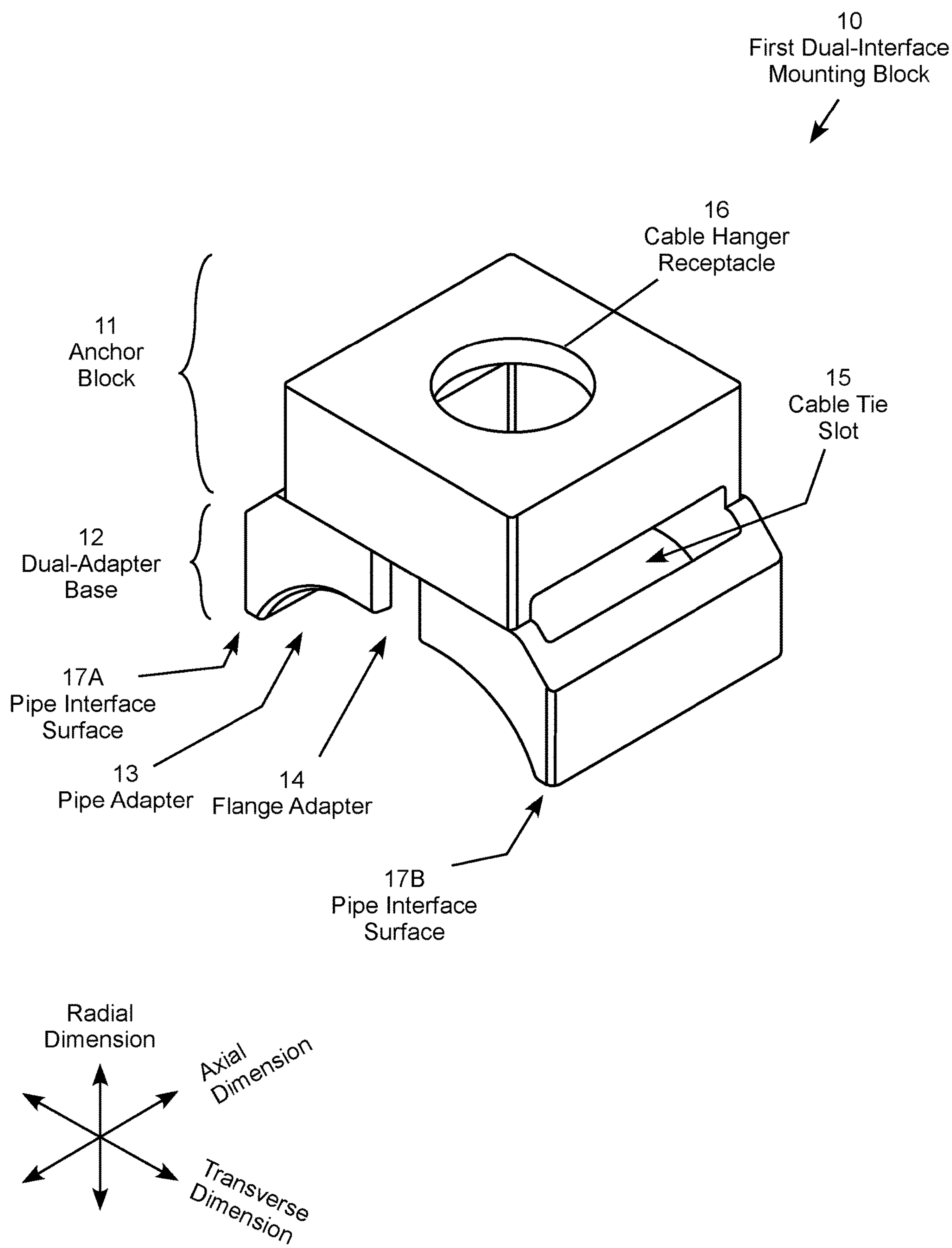
FIG. 1 is a perspective view of a first dual-interface mounting block including a pole adapter, a flange adapter, and a cable hanger receptacle.
Figure 2:
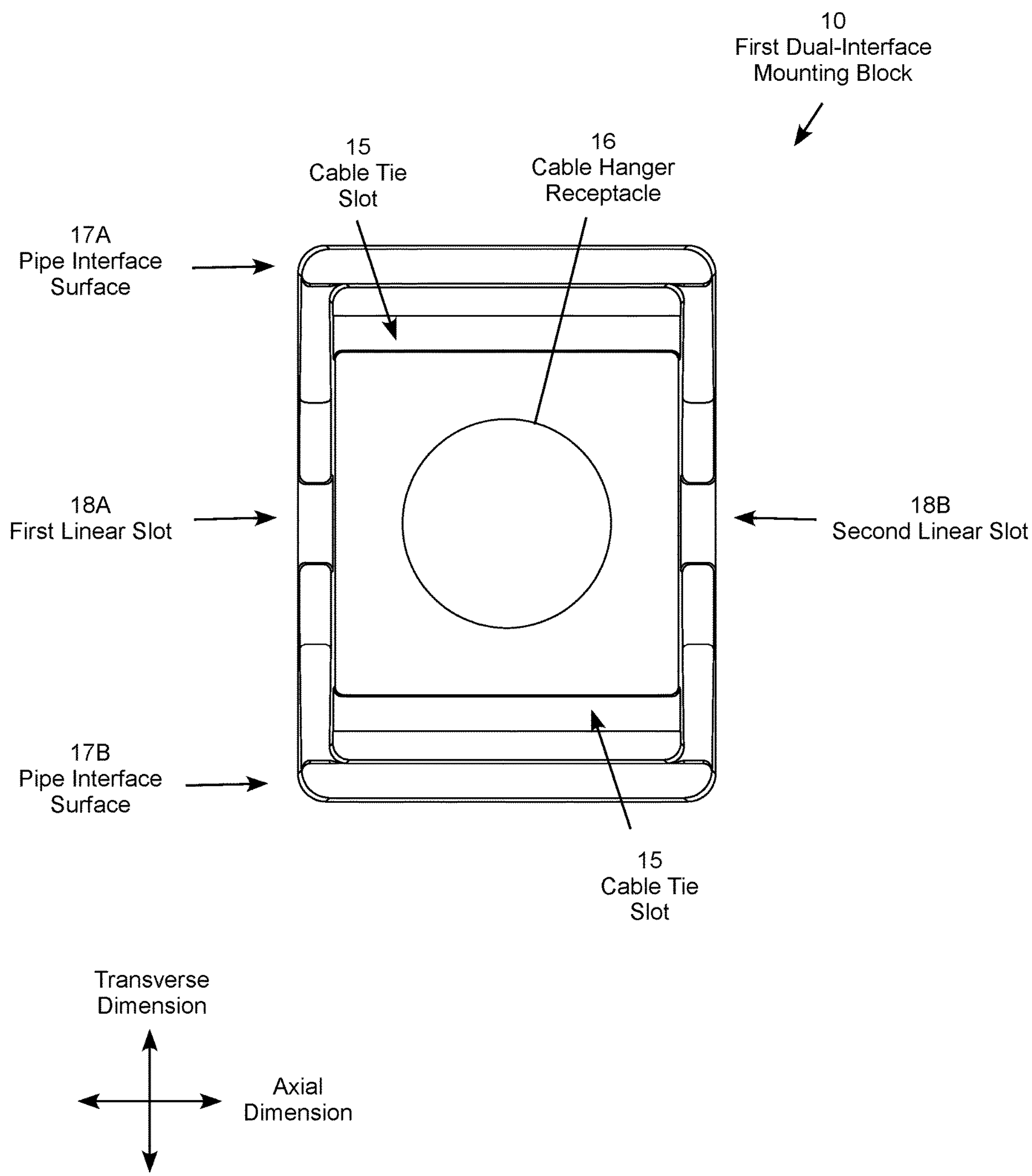
FIG. 2 is a bottom view of the first dual-interface mounting block.

FIG. 1 is a perspective view and FIG. 2 is a bottom view of a first example of a dual-interface mounting block. This embodiment is a first dual-interface mounting block 10 including an anchor block 11 and a dual-adapter base 12. The dual-adapter base 12 includes a pipe adapter 13 and a flange adapter 14. The anchor block 11 includes a cable tie slot 15 and a cable hanger receptacle 16.

A low-PIM cable tie or pipe clamp is inserted through the cable tie slot 15 and around a support structure, such as a mast or angle bar, to secure the dual-interface mounting block 10 to the support structure. The pole adapter 13 is configured to interface with masts within a range of different diameters, while the flange adapter 14 is configured to interface with flanges of different gauges (thicknesses). More specifically, the pipe adapter 13 includes a pair of spaced-apart pipe interface surfaces 17A and 17B allowing the pipe adapter 13 to interface with masts of different diameters. The flange adapter 14 includes a pair of linear slots 18A and 18B positioned between the spaced-apart pipe interface surfaces 17A and 17B allowing the flange adapter 14 to interface with flanges of different gauges.

In this particular embodiment, the cable hanger receptacle 16 is a standard 3/4-inch (1.9 cm) hole sized to receive standard cable hangers, such as the cable hangers described in U.S. Pat. No. 10,637,226, which is incorporated by reference. The pipe adapter 13 includes a pair of pipe interface surfaces 17A-17B allowing the pipe adapter to mount to masts in a range of varying diameters, similar to the low-PIM cable support brackets described in U.S. Pat. No. 10,724,655, which is incorporated by reference. The entire dual-interface mounting block 10 is fabricated from a low-PIM polymeric material, such as glass-filled nylon. Although the specific disclosed embodiments include one or two cable ties slots, various embodiments, in general, may include one, two or more cable tie slots, each of which may receive one, two or more cable ties or pipe clamps.

FIG. 3 is a side view of the first dual-interface mounting block 10 interfacing with masts having different diameters, in this illustration a first mast 30 having a larger diameter and a second mast 32 having a smaller diameter. The pipe interface surfaces 17A-17B allow the pipe adapter 13 to mount to the masts 30 and 32 having different diameters.

FIGS. 4A and 4B are side views of the first dual-interface mounting block 10 secured to angle supports 40 and 42, respectively, having different thickness (gauge). FIG. 4A shows the first dual-interface mounting block 10 secured to a first angle bar 40 having a larger gauge that fits snugly within the flange adapter 14 resulting in first cable tie path 41 around the first angle support 40. FIG. 4B shows the first dual-interface mounting block 10 secured to a second angle support 42 having a smaller gauge that fits caddy-corner within the flange adapter 14 resulting in second cable tie path 43 around the second angle support 42. The ability to tilt the mounting block with respect to the flange and use different cable tie paths allows the flange interface 14 to mount to the flanges having different gauges. While alternate cable tie paths result, the important point is ability to secure the interface block in place to flanges having different gauges. The snug fit version is the typical configuration. For a thinner gauge flange, the interface block rotates until each side of the flange adapter is making contact with a side of the flange. When the cable tie is tightened, the interface block is locked in place and strap tension resists the block rotating.

Figure 5:
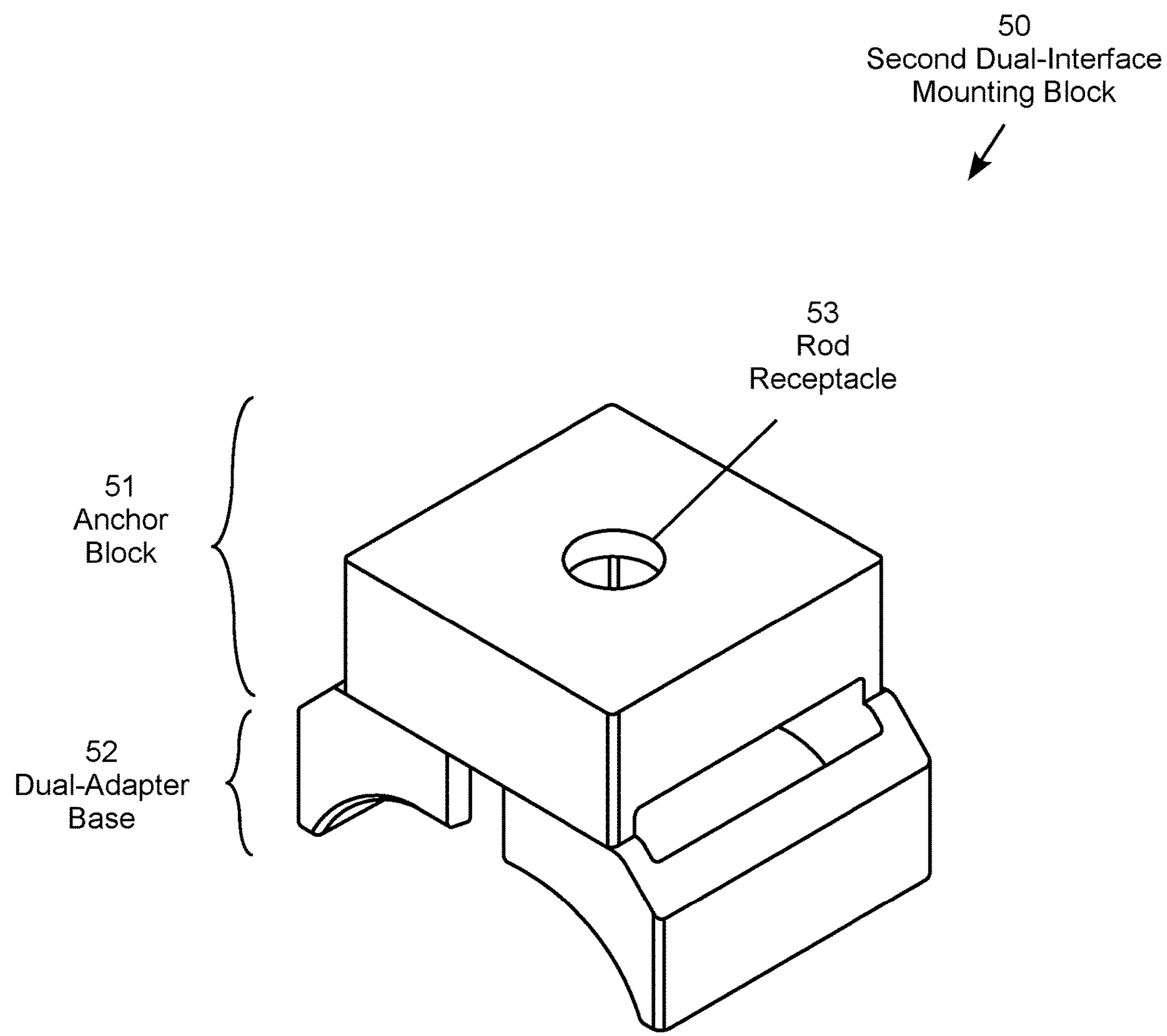
FIG. 5 is a perspective view of a second dual-interface mounting block including a pole adapter, a flange adapter, and a rod receptacle.
Figure 6:
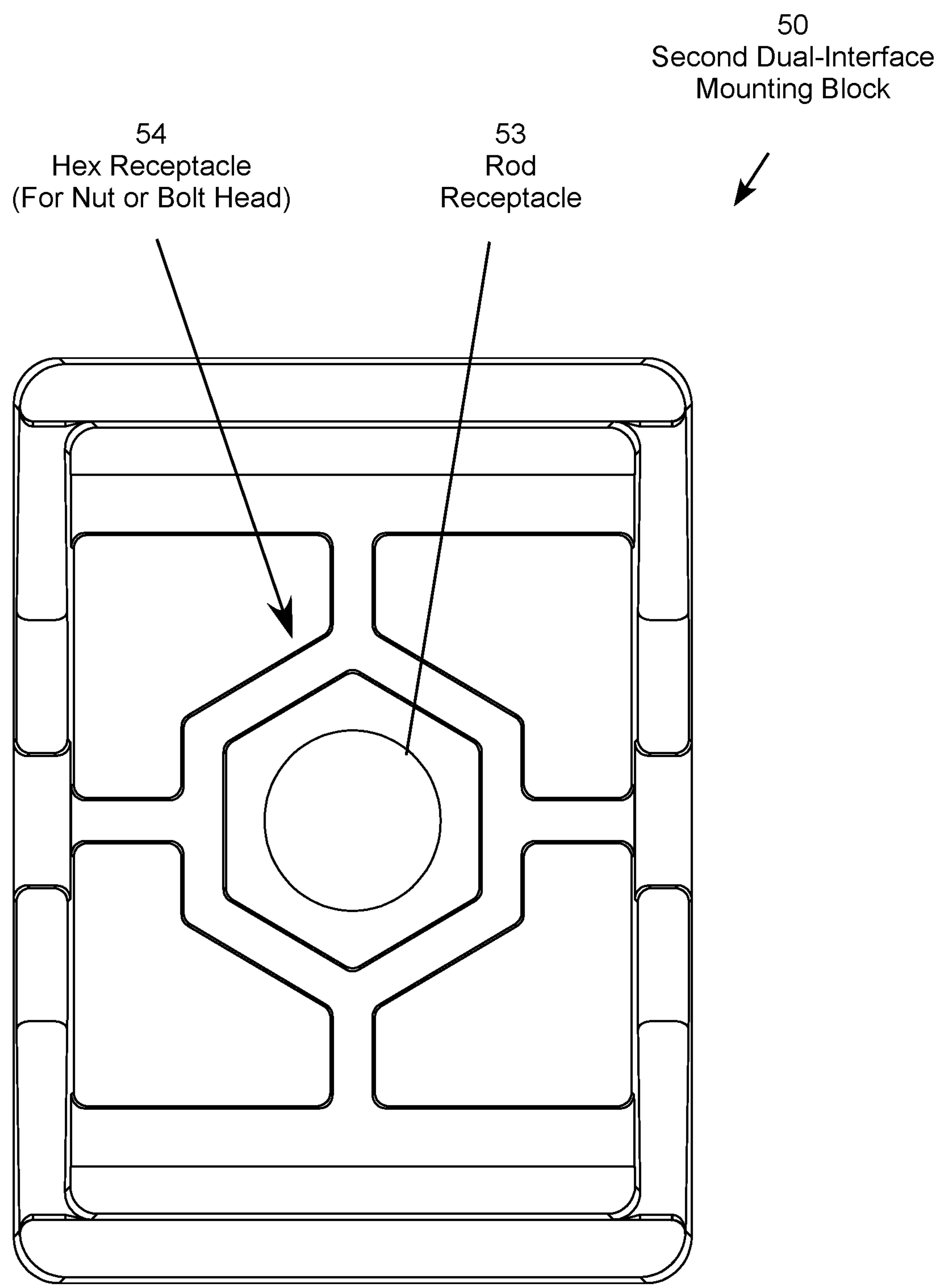
FIG. 6 is a bottom view of the second dual-interface mounting block including a pole adapter, a flange adapter, and a rod receptacle.

FIG. 5 is a perspective view and FIG. 6 is a bottom view of a second dual-interface mounting block 50 including an anchor block 51 and a dual-adapter base 52. The second dual-interface mounting block 50 is similar to the first dual-interface mounting block 10, except that the cable-hanger receptacle 16 of the first dual-interface mounting block 10 is replaced by a rod receptacle 53 in the second dual-interface mounting block 50. As shown in FIG. 6, the bottom side of the rod receptacle 53 includes a hex receptacle 54 for capturing a hex nut or bolt head.

Figure 7:
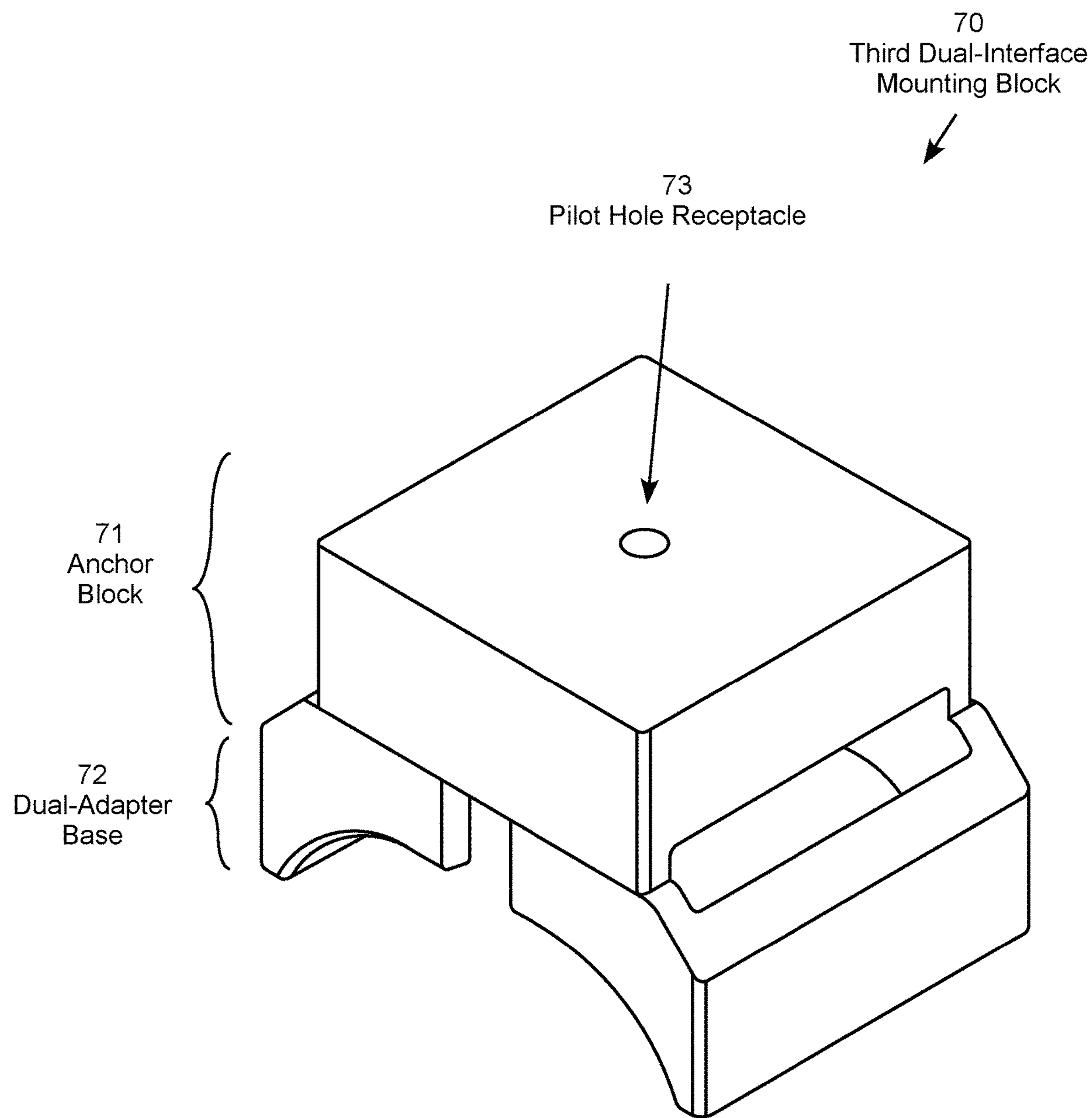
FIG. 7 is a perspective view of a third dual-interface mounting block including a pole adapter, a flange adapter, and a pilot hole receptacle.
Figure 8:
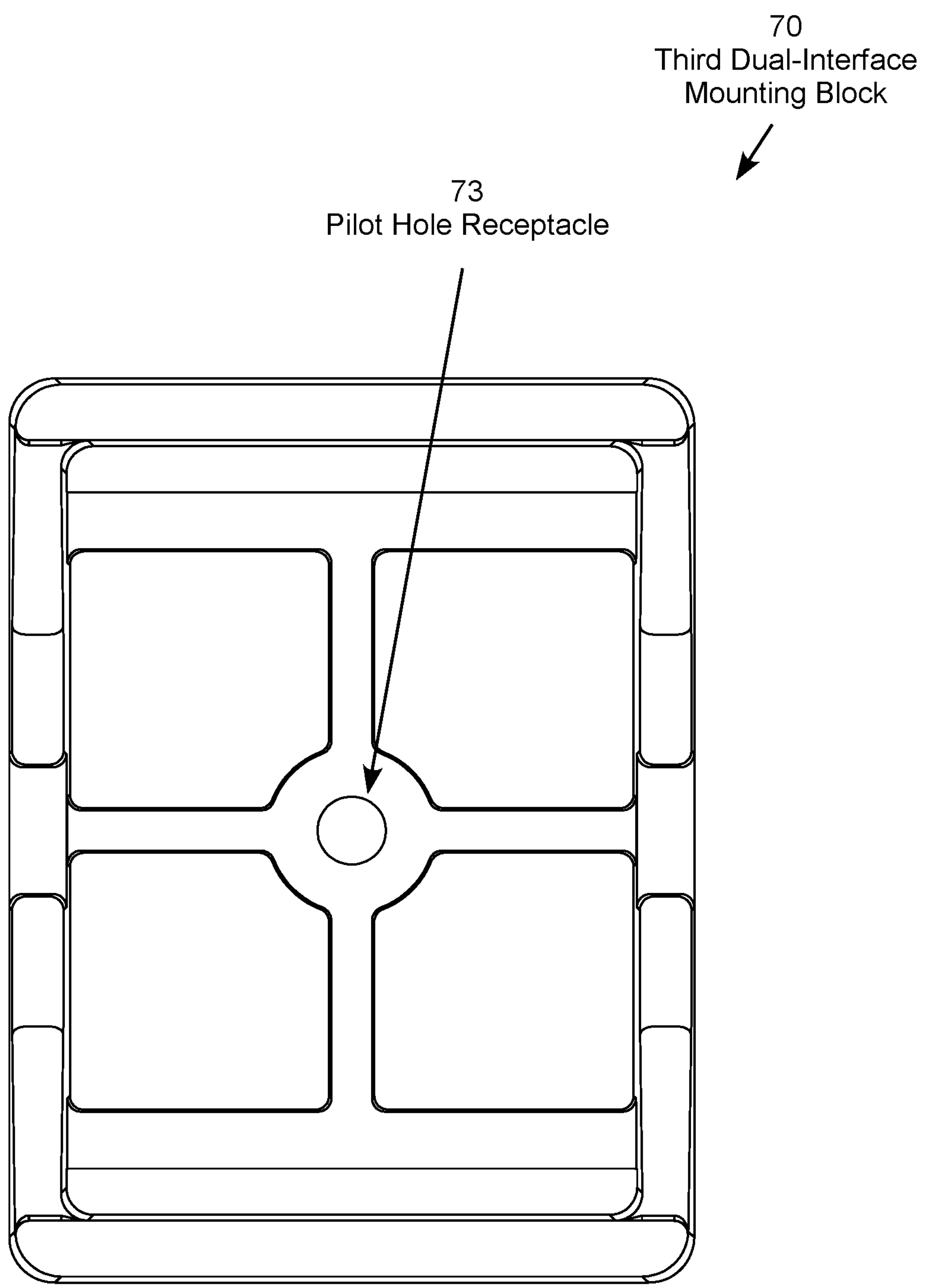
FIG. 8 is a bottom view of the third dual-interface mounting block.

FIG. 7 is a perspective view and FIG. 8 is a bottom view of a third dual-interface mounting block 70 including an anchor block 71 and a dual-adapter base 72. The third dual-interface mounting block 70 is similar to the first dual-interface mounting block 10, except that the cable-hanger receptacle 16 of the first dual-interface mounting block 10 is replaced by a pilot hole receptacle 73 for a self-tapping screw in the third dual-interface mounting block 70.

Figure 9:
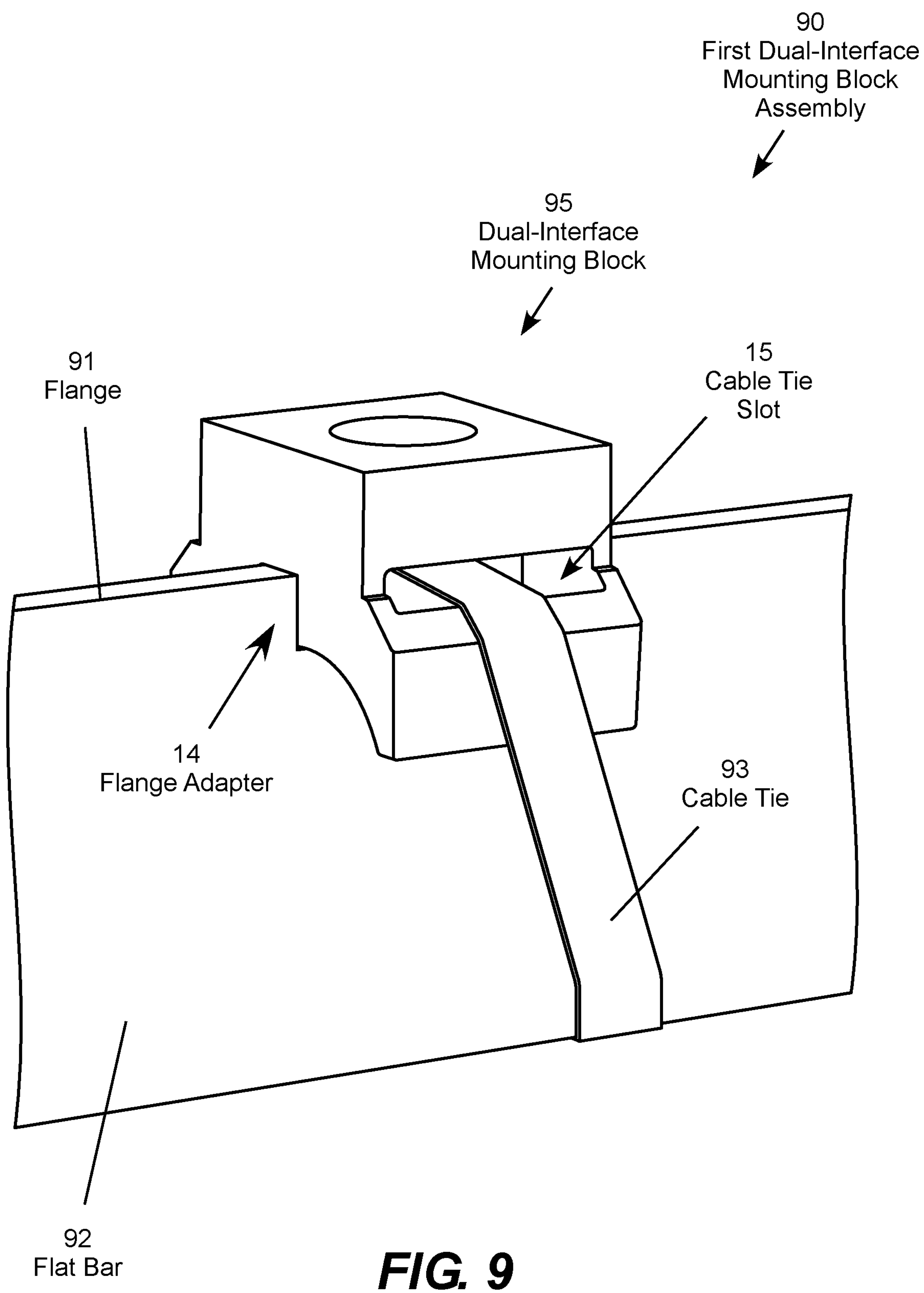
FIG. 9 is a perspective view of a first dual-interface mounting block assembly.

FIG. 9 is a perspective view of a dual-interface mounting block assembly 90 including a first dual-interface mounting block 95 secured to a flange 91 of a flat bar 92 support structure. A cable tie 93 extends through the cable tie slot 15 of the first dual-interface mounting block 95 and around the flat bar 92. In this particular embodiment, the flange 91 of the flat bar 92 is snugly received in the flange adapter 14 of the first dual-interface mounting block 95.

Figure 10:
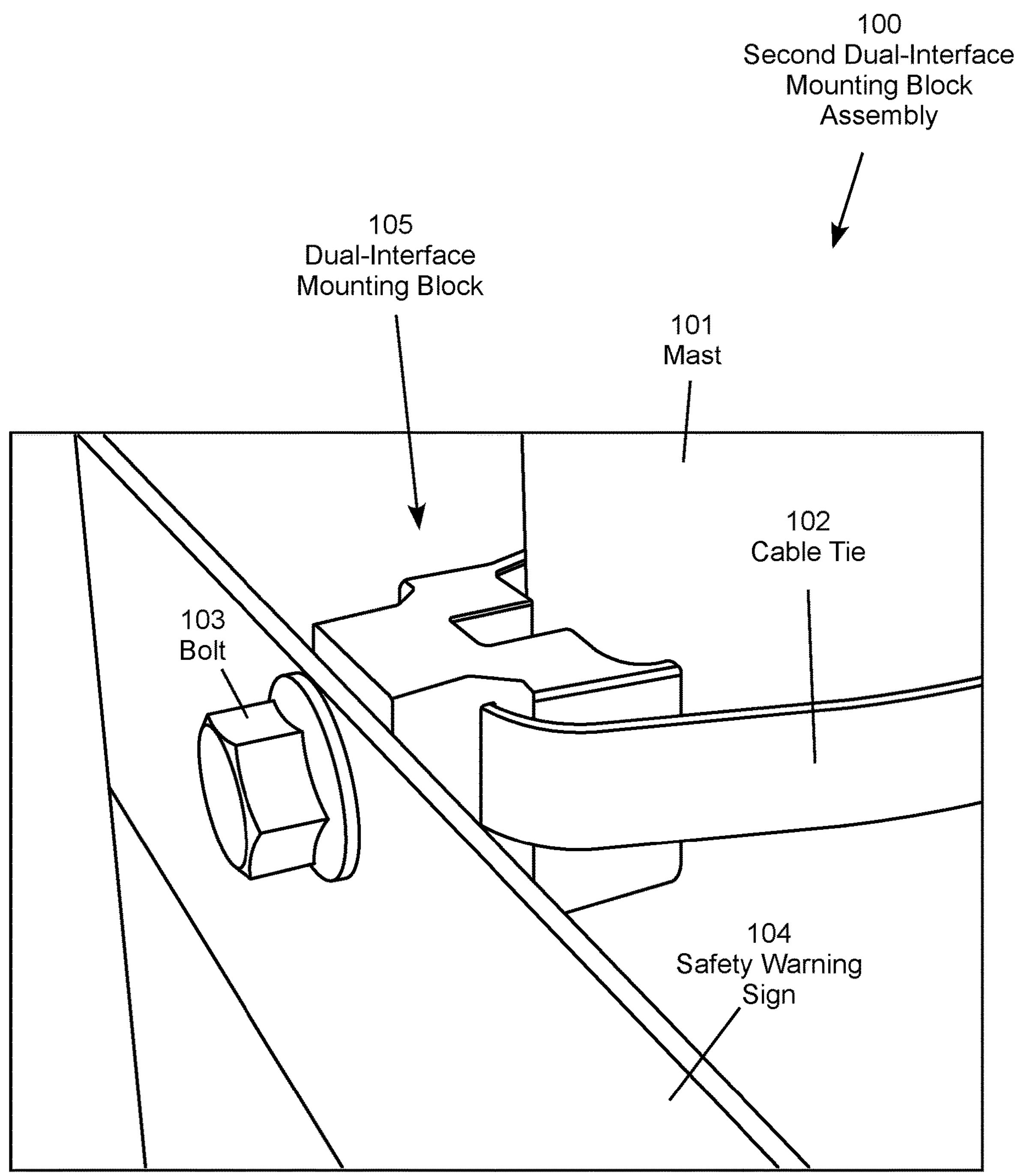
FIG. 10 is a perspective view of a second dual-interface mounting block assembly.

FIG. 10 is a perspective view of a second dual-interface mounting block assembly 100 including a dual-interface mounting block 105 secured to a mast 101 support structure. A cable tie 102 extends through the cable tie slot of the dual-interface mounting block 105 and around mast 101 support structure. In this particular embodiment, a hex bolt 103 attached to a hex nut captured in the rod receptacle of the dual-interface mounting block 105 secures a safety warning sign 104 to the dual-interface mounting block.

Figure 11:
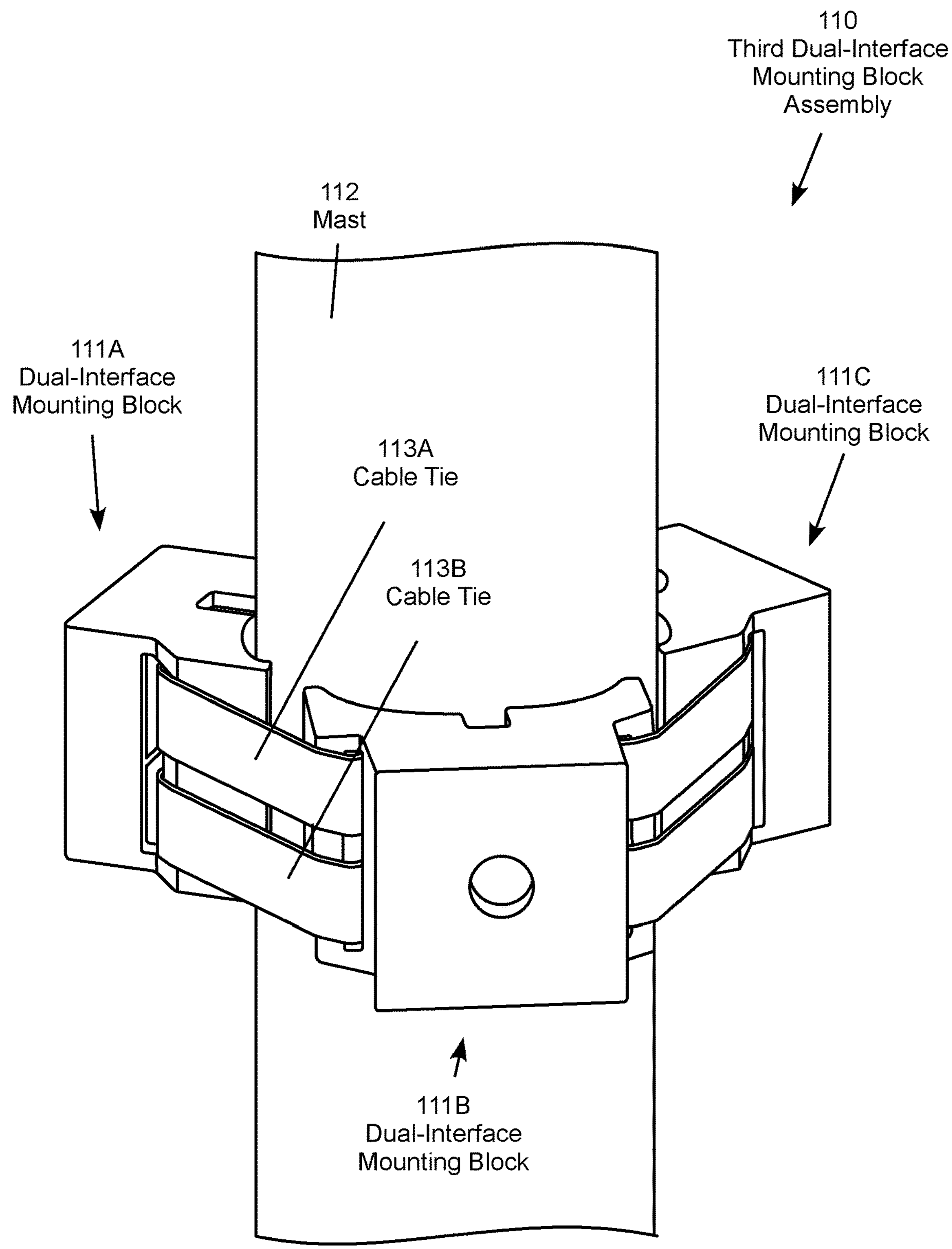
FIG. 11 is a perspective view of a third dual-interface mounting block assembly.

FIG. 11 is a perspective view of a third dual-interface mounting block assembly 110 that includes three dual-interface mounting blocks 111A, 1118 and 111C secured to a common mast 112 support structure. In this particular embodiment, two cable ties 113A and 113B secure the mounting blocks 111A, 111B and 111C to the common mast 112 support structure.

Figure 12:
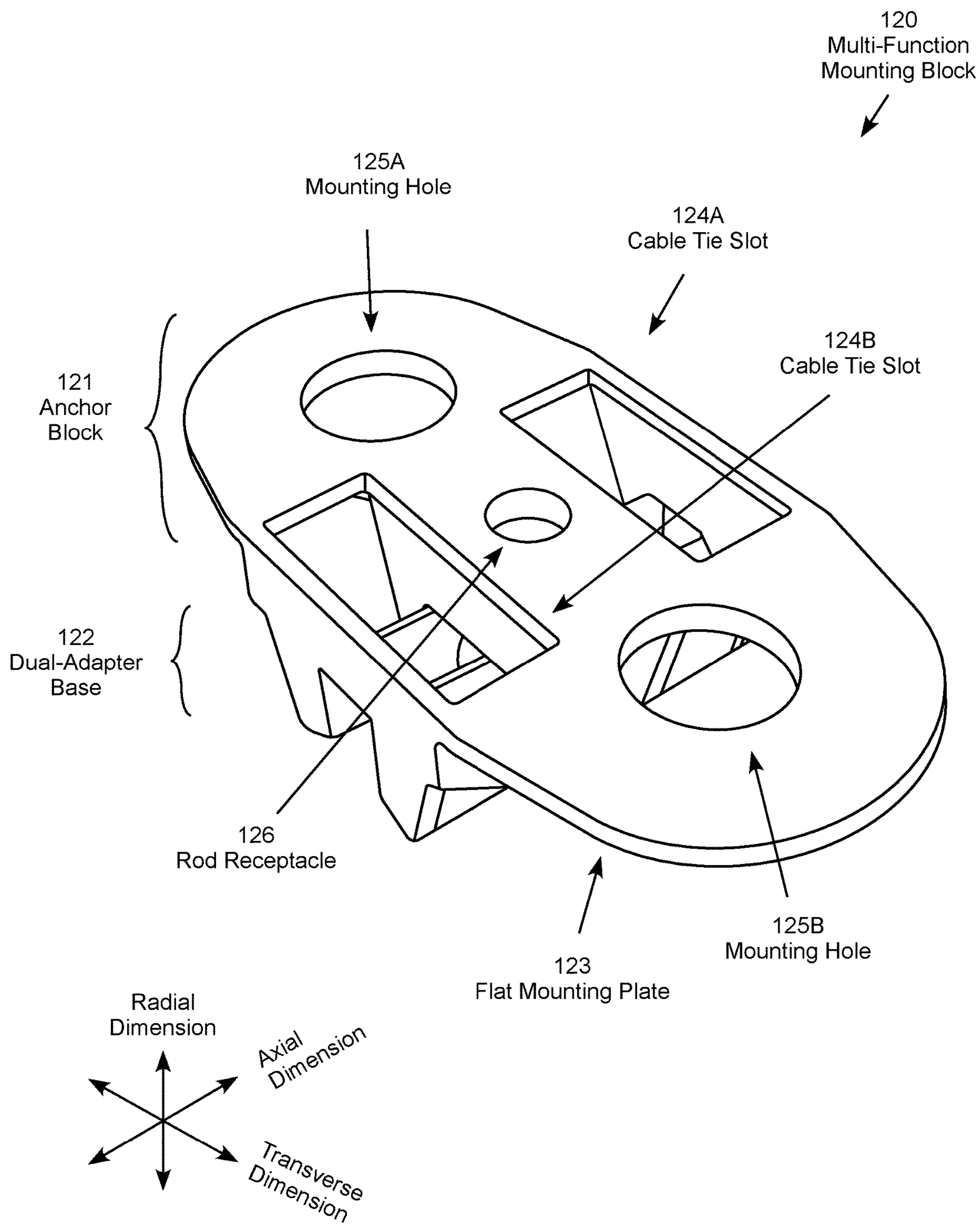
FIG. 12 is a top perspective view of a multi-function mounting block.
Figure 13:
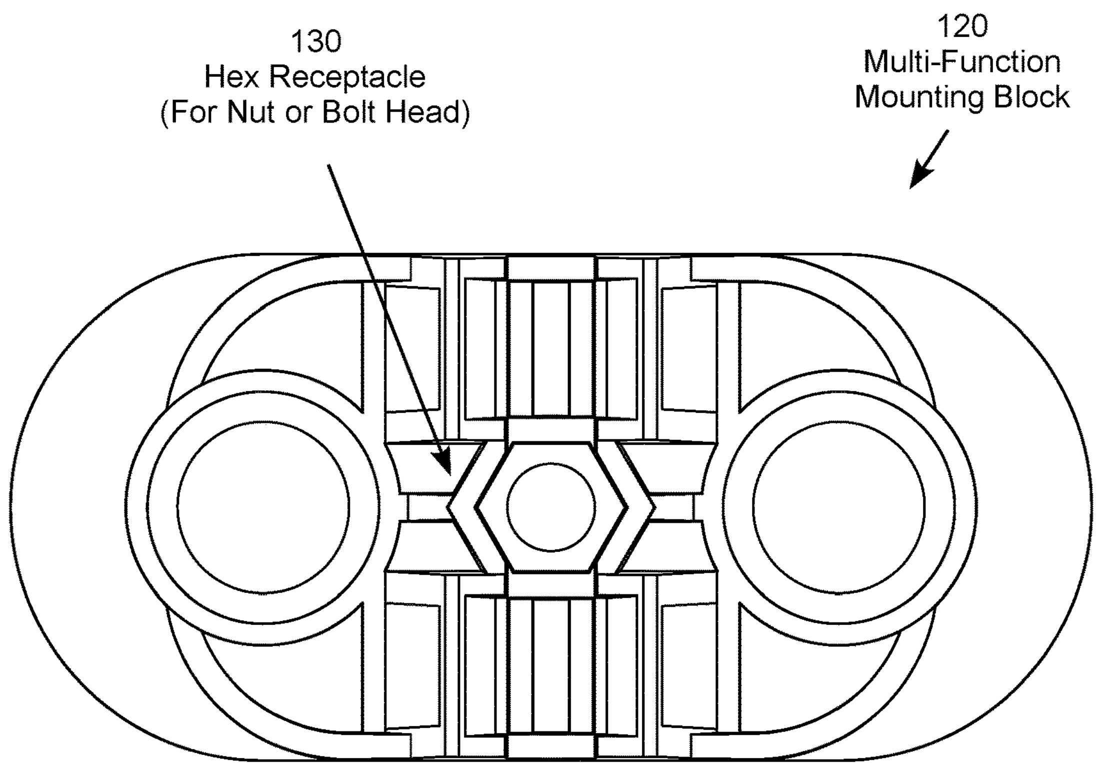
FIG. 13 is a bottom view of the multi-function mounting block.
Figure 14:
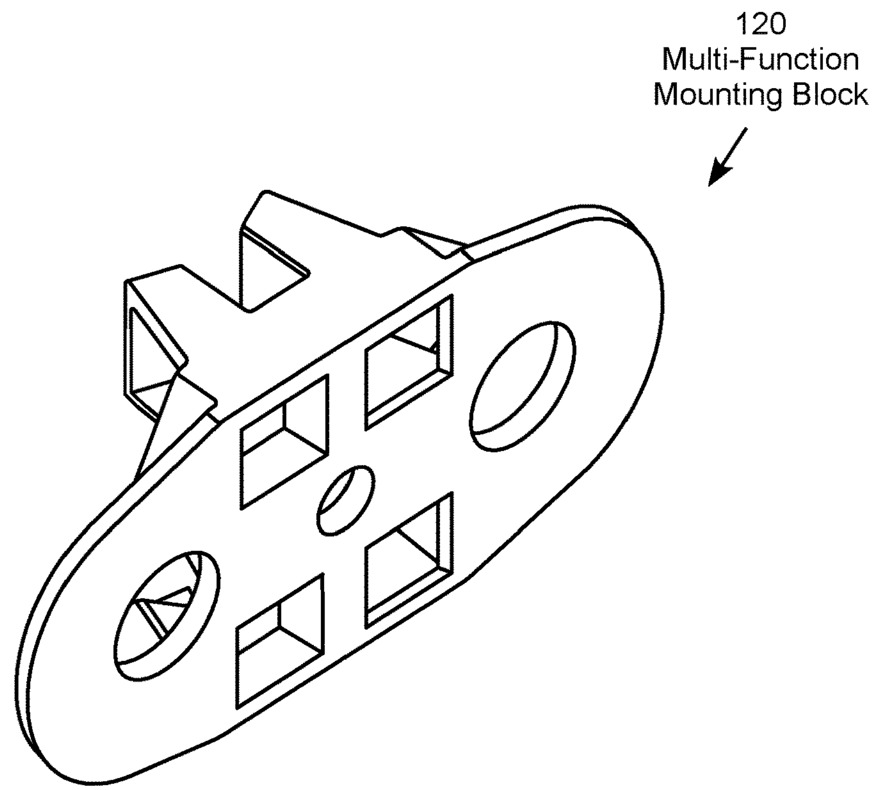
FIG. 14 is a side perspective view of the multi-function mounting block.

FIG. 12 is a top perspective, FIG. 13 is a bottom view, and FIG. 14 is a side perspective view of a multi-function mounting block 120 including an anchor block 121 and a dual-adapter base 122. The dual-adapter base 122 is similar to the dual-adapter base 12 in the dual-interface mounting blocks 10, 50 and 70 described previously. The anchor block 121 includes a flat mounting plate 123 and a hex receptacle 130 for capturing a hex nut bolt head. In this particular example, the flat mounting plate 123 includes two cable tie slots 124A and 124B for alternatively securing the multi-function mounting block 120 to a mast or flange support structure. The anchor block 121 also includes two mounting holes 125A, 125B and a rod receptacle 126 for securing items to the anchor block 121, such as signs, control boxes and the like. The mounting holes 125A, 125B may be 3/4-inch (1.9 cm) holes sized to receive standard cable hangers.

Figure 15:
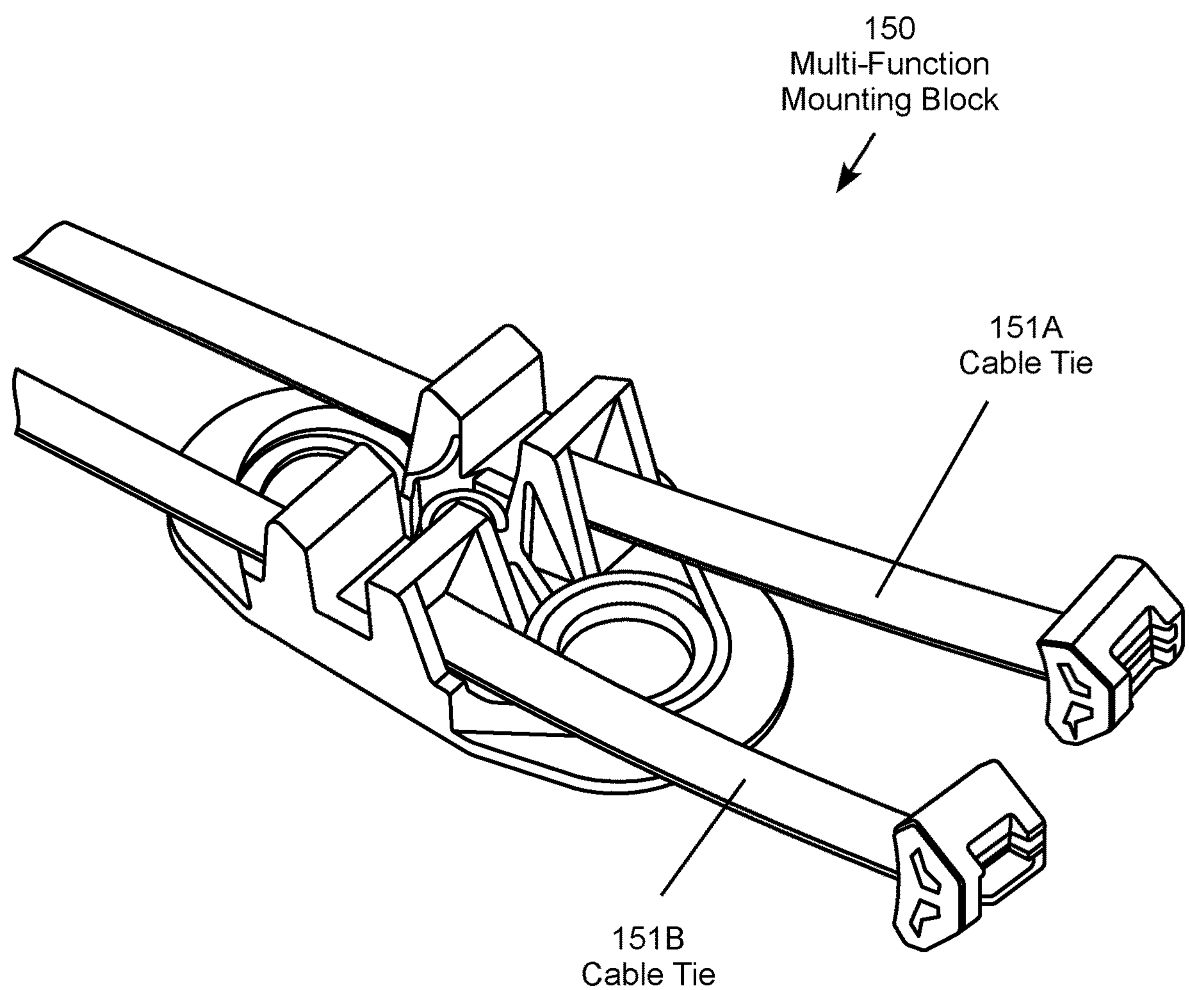
FIG. 15 is a bottom perspective view of the multi-function mounting block with cable ties.
Figure 16:
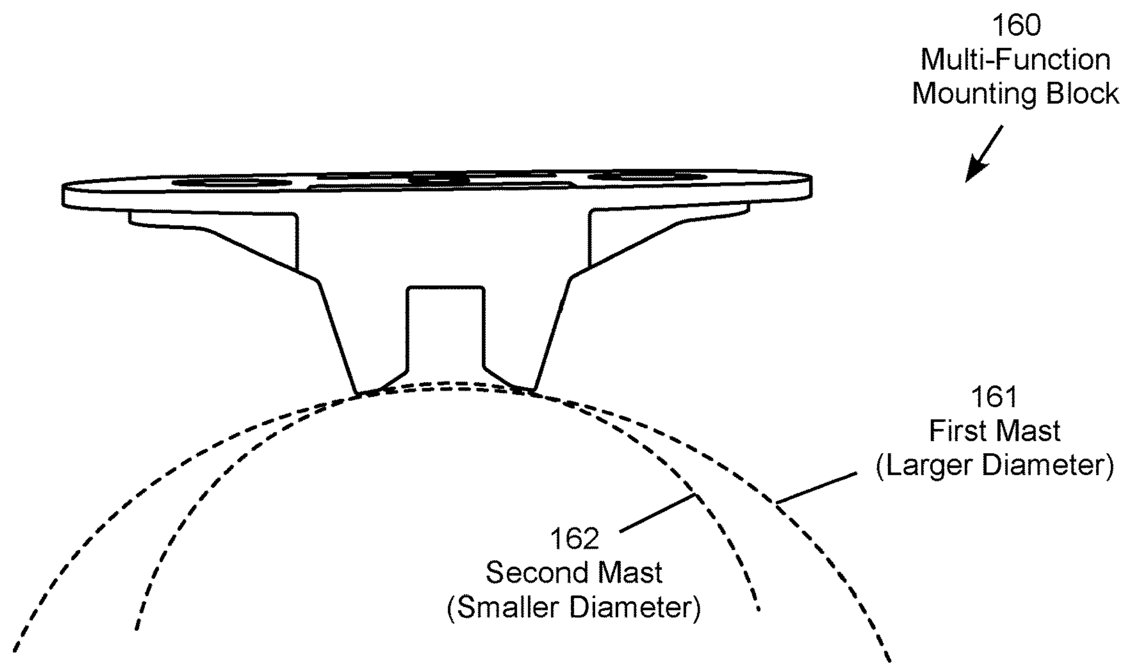
FIG. 16 is a side view of the multi-function mounting block interfacing with masts with different diameters.
Figure 17:
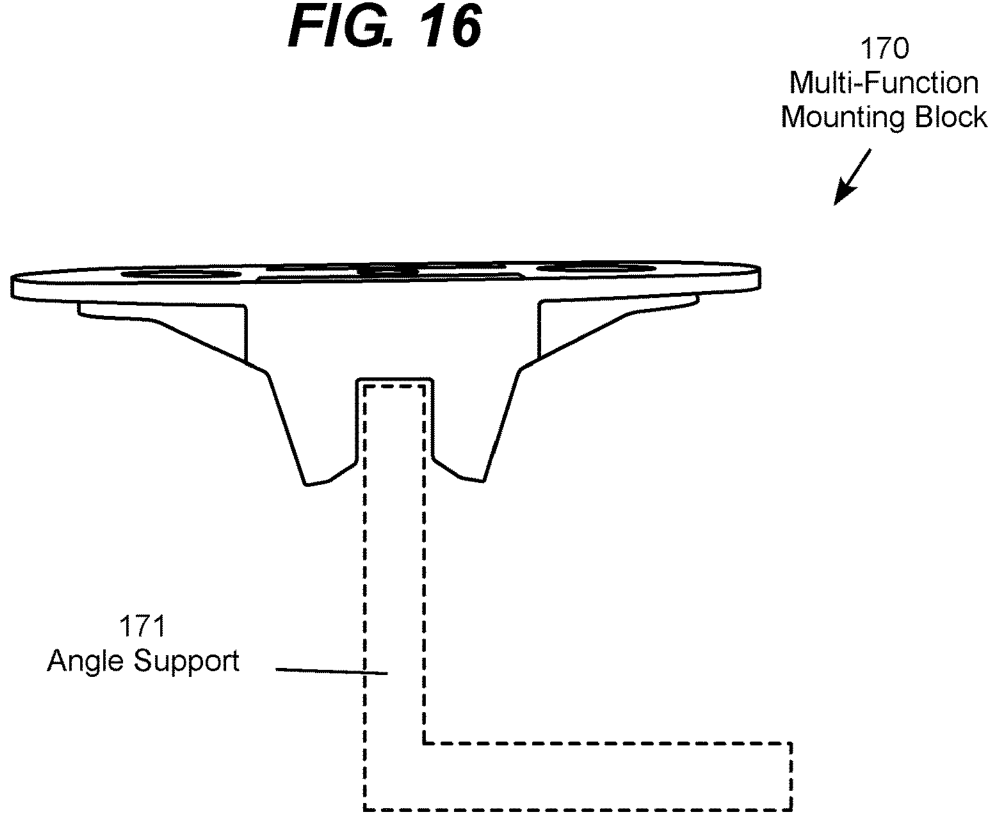
FIG. 17 is a side view of the multi-function mounting block interfacing with a flange.

FIG. 15 is a bottom perspective view of the multi-function mounting block 150 with cable ties 151A, 151B inserted through the cable tie slots of the multi-function mounting block. FIG. 16 is a side view of a multi-function mounting block 160 interfacing with masts with different diameters 161, 162. FIG. 17 is a side view of a multi-function mounting block 170 interfacing with a flange 171.

Figure 18A:
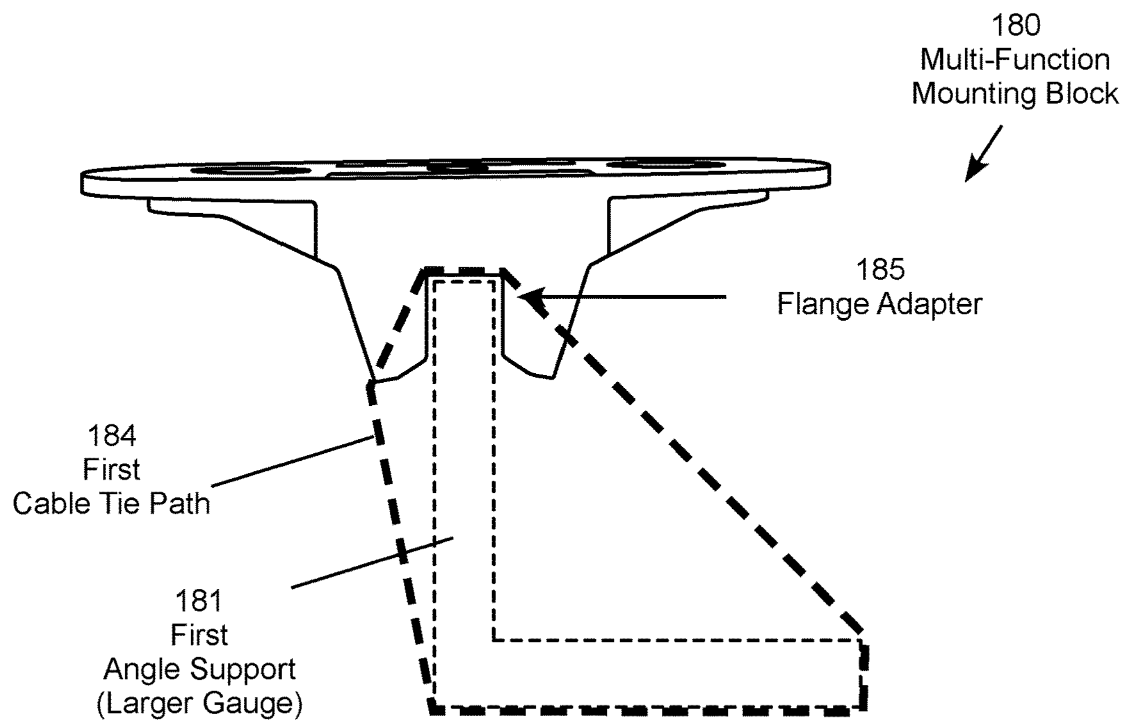
FIG. 18A is a side view of the multi-function mounting block interfacing with a flange having a first gauge illustrating a first cable tie path.
Figure 18B:
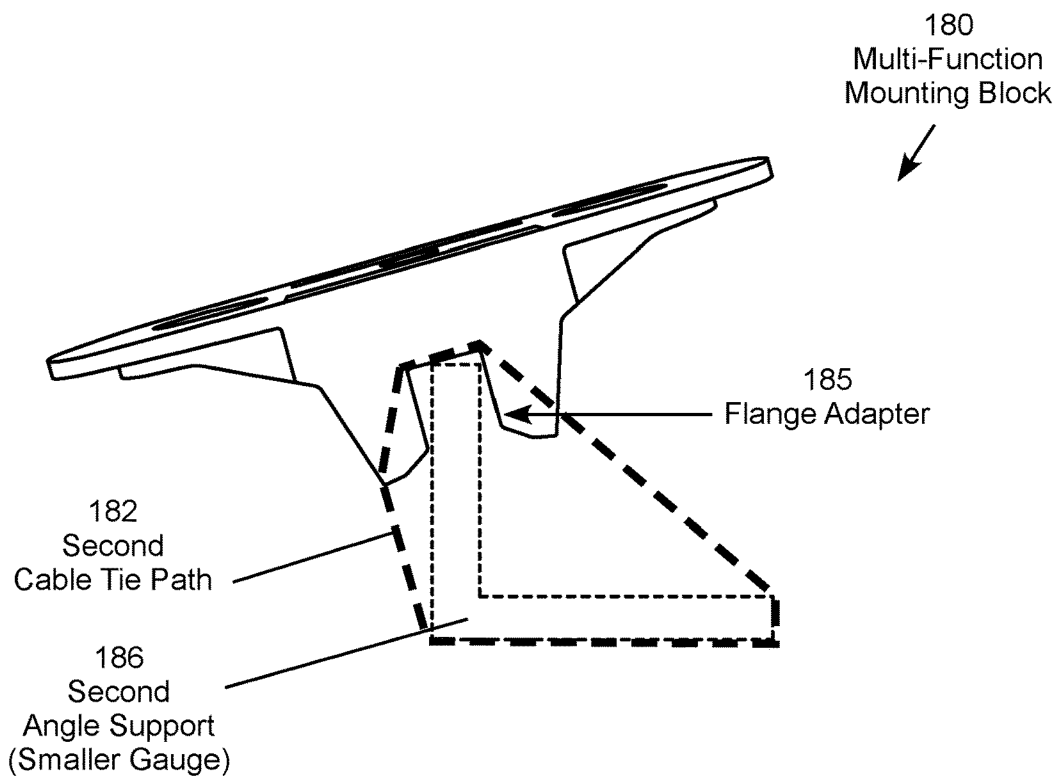
FIG. 18B is a side view of the multi-function mounting block interfacing with a flange having a second gauge illustrating a second cable tie path.

FIGS. 18A and 18B are side views of the multi-function mounting block 180 secured to angle supports 181 and 186, respectively, having different thickness (gauge). FIG. 18A shows the multi-function mounting block 180 secured to a first angle support 181 having a larger gauge that fits snugly within the flange adapter 185 resulting in first cable tie path 184 around the first angle support 181. FIG. 18B shows the multi-function mounting block 180 secured to a second angle support 186 having a smaller gauge that fits caddy-corner within the flange adapter 185 resulting in second cable tie path 182 around the second angle support 186.

Figure 19:
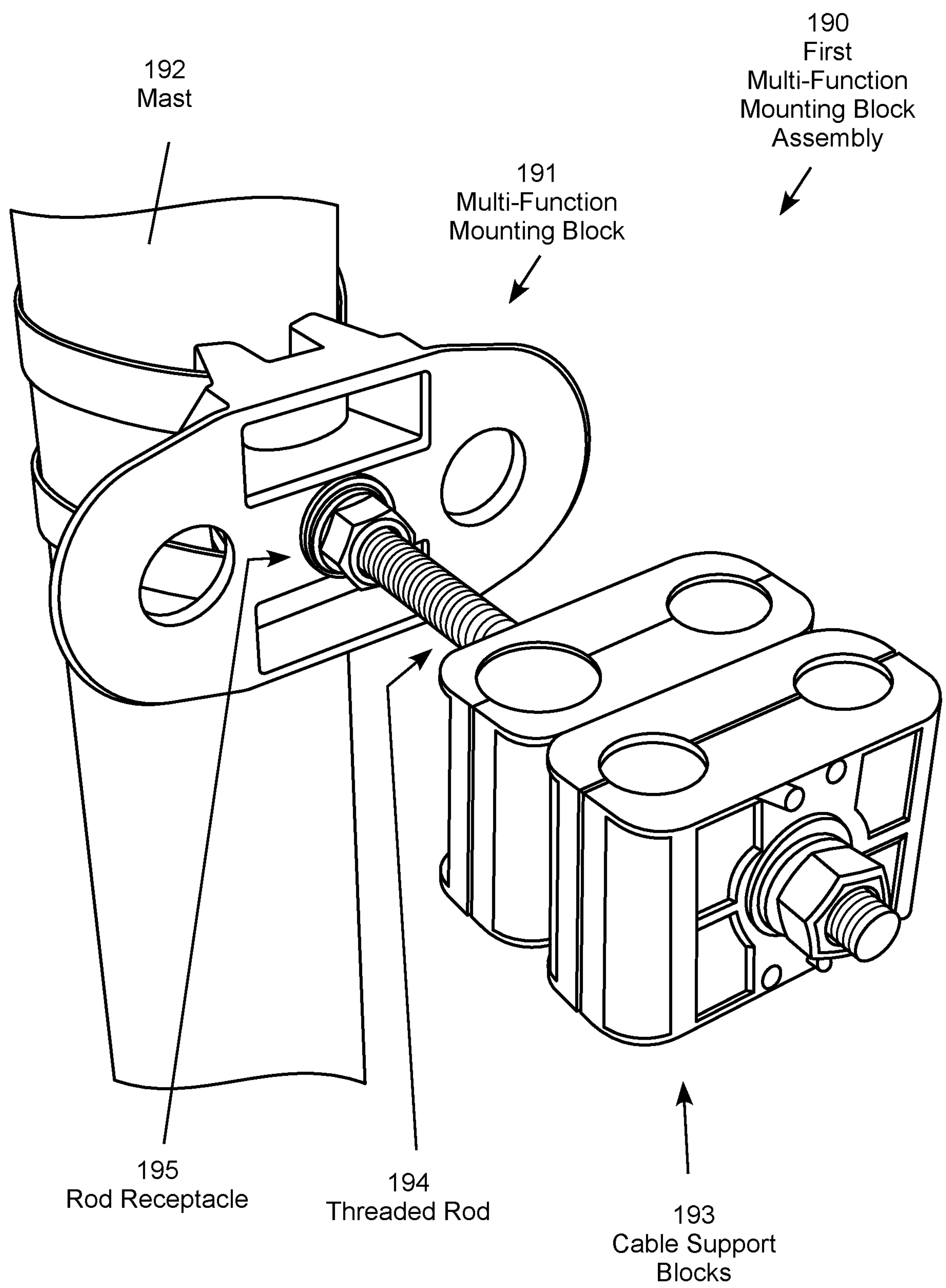
FIG. 19 is a perspective view of a first multi-function mounting block assembly.

FIG. 19 is a perspective view of a first multi-function mounting block assembly 190 including a multi-function mounting block 191 attached to a mast 192 support structure. The multi-function mounting block 191 also supports cable support blocks 193 attached to a threaded rod 194, which is attached to the rod receptacle 195 of the multi-function mounting block.

Figure 20:
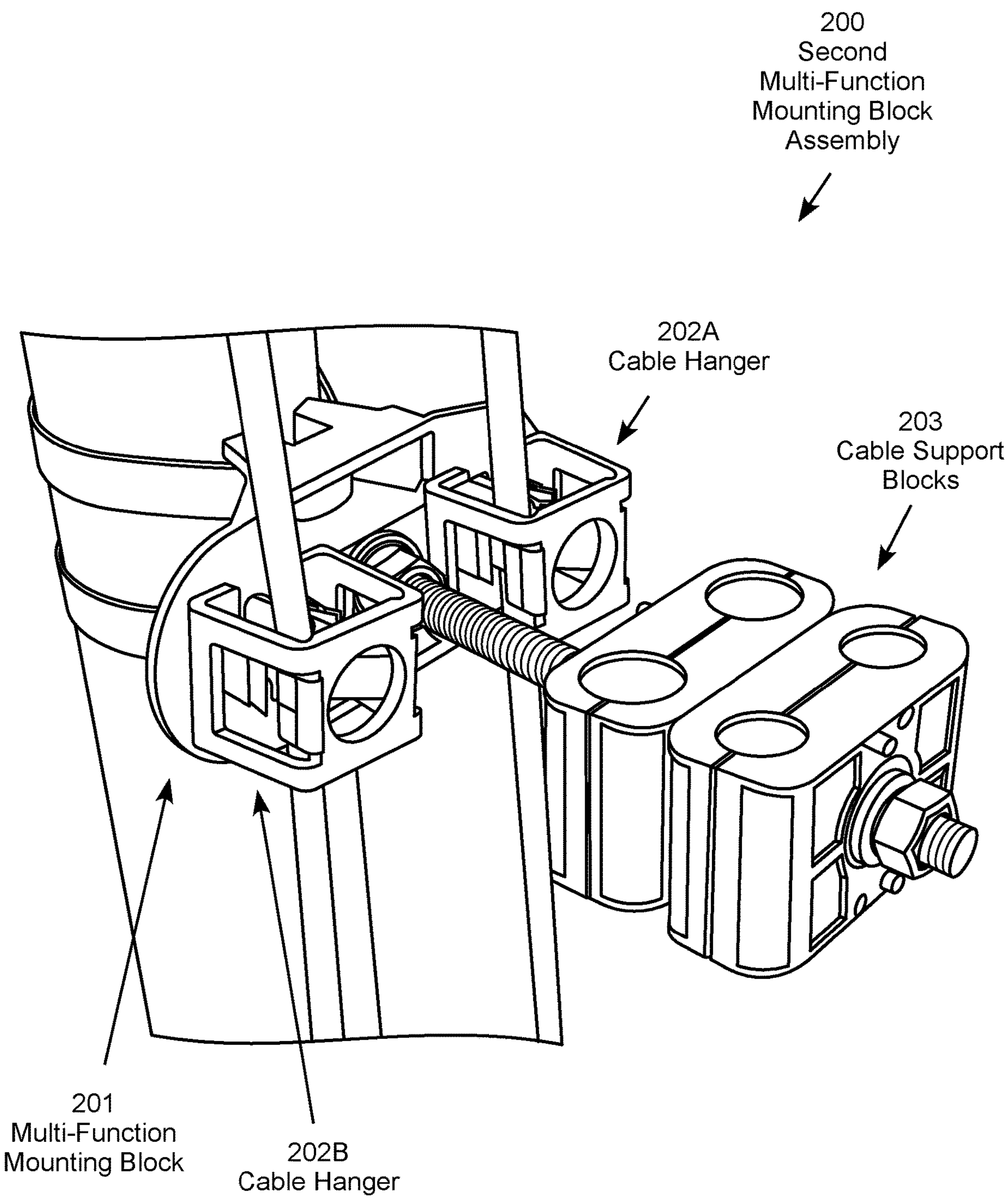
FIG. 20 is a perspective view of a second multi-function mounting block assembly.

FIG. 20 is a perspective view of a second multi-function mounting block assembly 200. This embodiment is similar to the first multi-function mounting block assembly 190 except that the multi-function mounting block 201 also supports a pair of cable hangers 202A, 202B in addition to cable support blocks 203.

Figure 21:
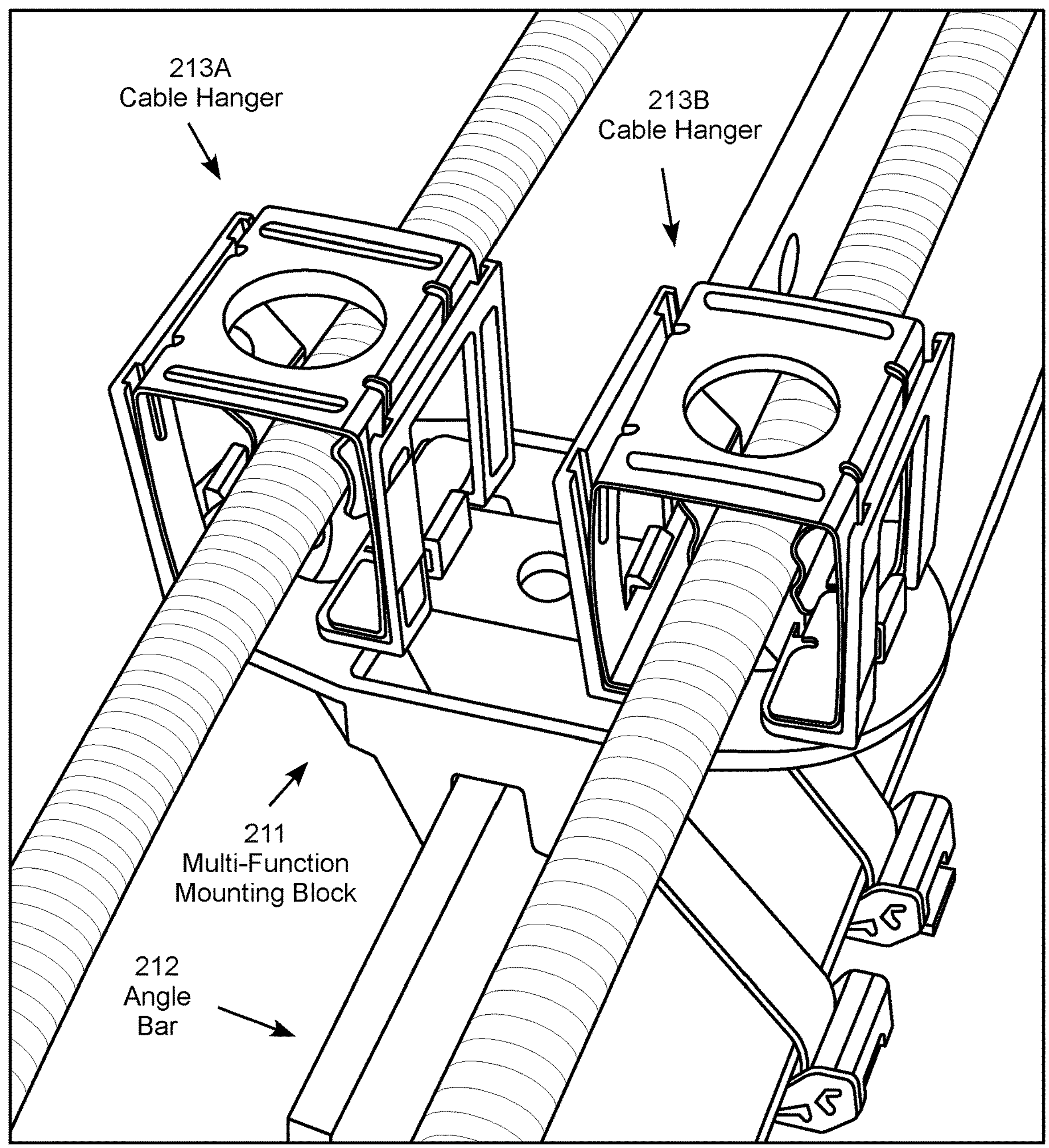
FIG. 21 is a perspective view of a third multi-function mounting block assembly.

FIG. 21 is a perspective view of a third multi-function mounting block assembly 210. This embodiment includes a multi-function mounting block 211 mounted to an angle bar 212 supporting two cable hangers 213A, 213B.

Figure 22:
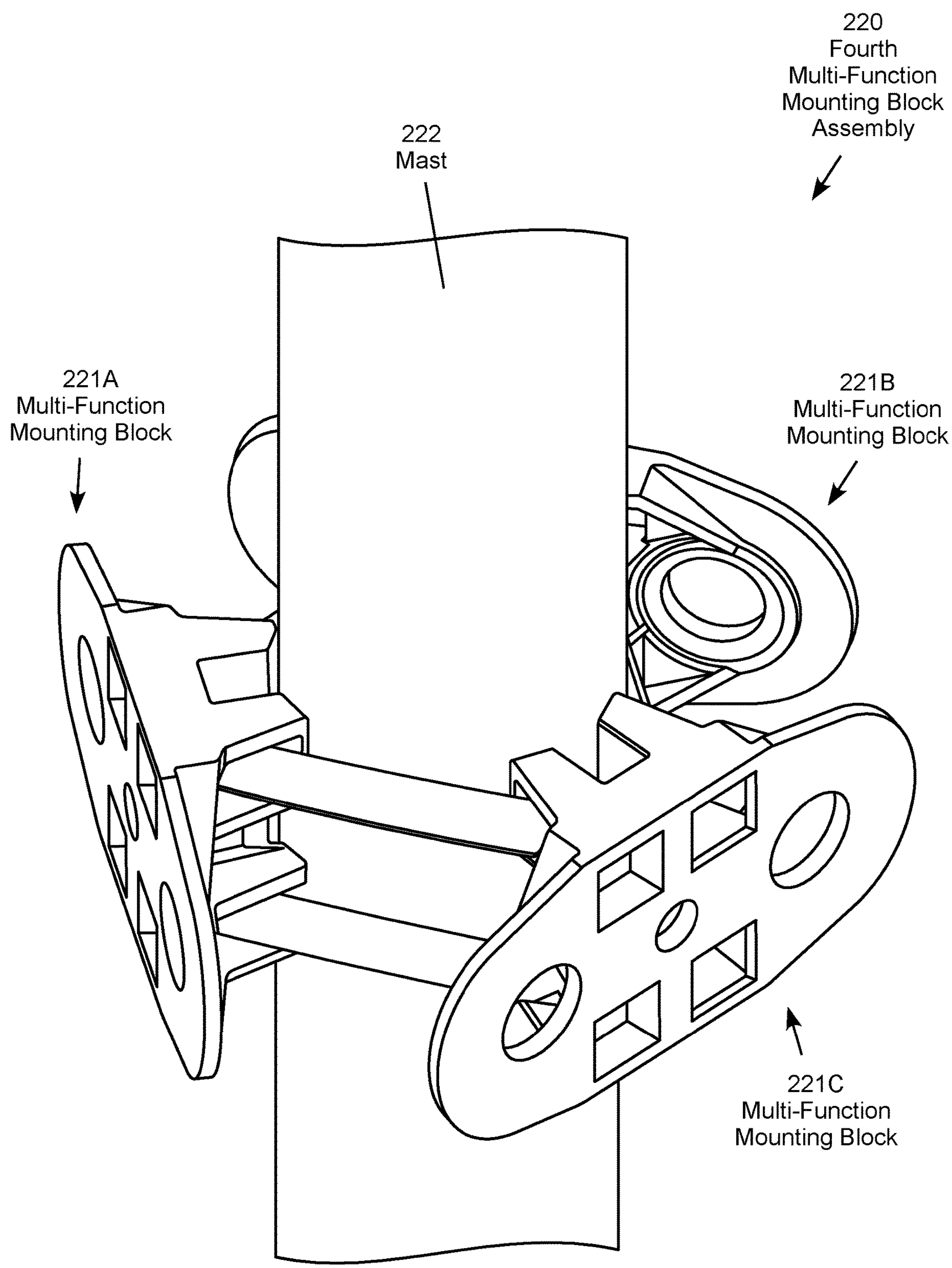
FIG. 22 is a perspective view of a fourth multi-function mounting block assembly.

FIG. 22 is a perspective view of a fourth multi-function mounting block assembly 220 including three multi-function mounting blocks 221A, 221B and 221C mounted to a common mast 222.

Figure 23A:
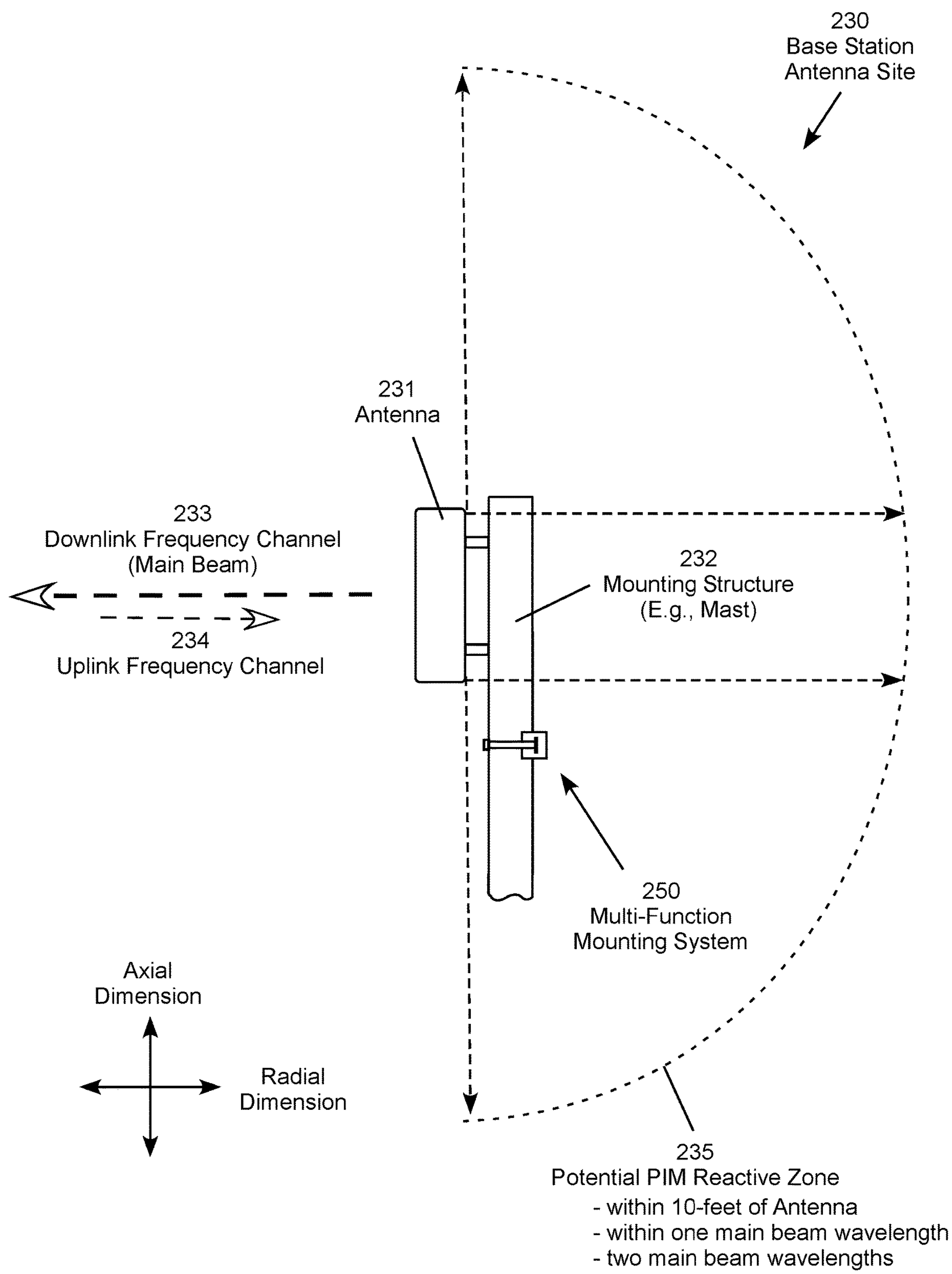
FIG. 23A is a conceptual side view of a low-PIM multi-function mounting system positioned within a potential PIM reactive zone of a base station antenna.
Figure 23B:
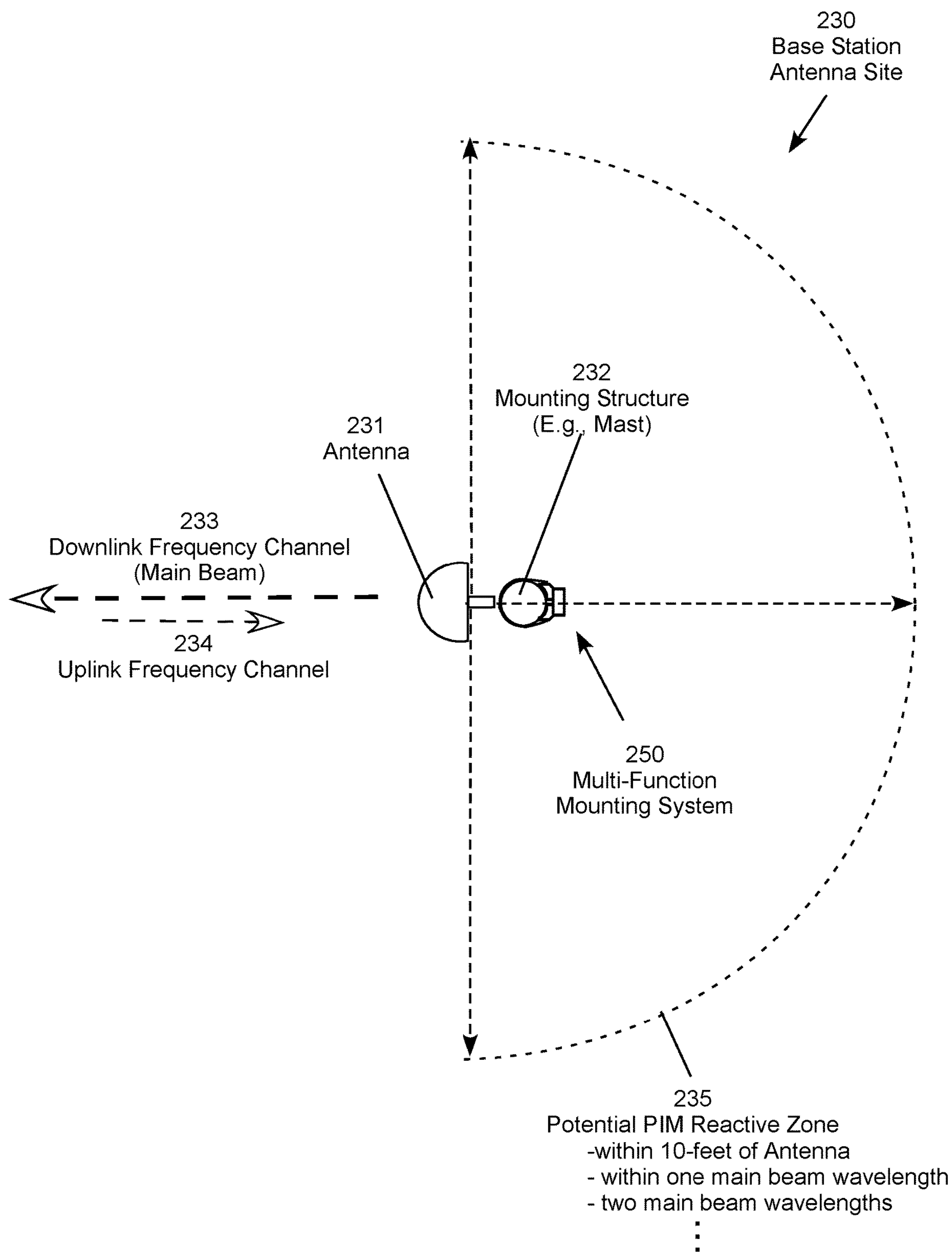
FIG. 23B is a conceptual top view of the low-PIM multi-function mounting system positioned within a potential PIM reactive zone of a base station antenna.

FIG. 23A is a conceptual side view and FIG. 23B is a conceptual top view of a representative base station cell site 230 that includes a base station antenna 231 supported by a mounting structure 232. To briefly recap the problem to be solved, the antenna 231 directionally broadcasts higher-power downlink communication signals away from the antenna (generally referred to as the "main beam" of the antenna) within a downlink frequency channel 233 to registered mobile communication devices within the communication reach of the antenna. The antenna 231 also receives lower-power uplink communication signals from the registered mobile communication devices within a separate uplink frequency channel 234 allowing for duplex communications, such as mobile telephone conversations, between the antenna 231 and the registered mobile communication devices within the communication reach of the antenna. Passive intermodulation ("PIM") interference occurs when the downlink signals within the downlink frequency channel 233 mix at nonlinear junctions near the antenna 231 to create noise within the uplink frequency channel 234 received by the antenna. The PIM interference decreases the signal-to-interference plus-noise ratio ("SINR") of the uplink within the uplink channel of the antenna 231, which reduces the communication quality and information carrying capacity (bandwidth) of the uplink frequency channel.

It is well documented that loosely touching metal-to-metal surfaces can behave in a non-linear fashion and become sources of PIM interference when illuminated by high power RF signals. For this reasons, the coaxial cables and other components associated with operation of the antenna are located well outside and behind the main beam of the antenna. It has recently been determined, however, that loose metal-to-metal connections located behind a base station antenna can generate high levels of passive intermodulation. Even though this region is well outside the main beam of the antenna, enough RF energy can be present in this region to excite non-linear objects and generate PIM interference. Metal brackets and associated hardware for supporting RF, optical, ground and remote electrical tilt ("RET") cables are common sources of loose metal-to-metal contact found in this region behind and close to the base station antenna. Embodiments of the present invention include a range of low-PIM multi-function mounting system designed to mitigate the generate PIM interference by the equipment used to support the cables and other components associated with the operation of the antenna, which are typically located near the antenna outside the main beam of the antenna.

To develop standards for mitigating PIM, technicians may define a potential PIM reactive zone 235 in which PIM mitigation equipment should be installed. FIGS. 23A-23B illustrate this practice for a representative example base station antenna site 230, in which a low-PIM multi-function mounting system 250 is attached to a mounting structure 232 within a potential PIM reactive zone 235 defined for the antenna 231. In this example, the representative low-PIM multi-function mounting system 250 is located well outside the main beam 233 and physically behind the antenna 231 on the opposite side of the mounting structure 232 from the antenna. The low-PIM multi-function mounting system 250 is nevertheless specified to provide PIM mitigation because it is still located with the potential PIM reactive zone 235 defined for the antenna 231. The low-PIM multi-function mounting system 250 is representative the embodiments of the invention generally, as all of the embodiments described in the disclosure, and variations of these specific examples, are intended for deployment as PIM mitigation measures in the potential PIM reactive zones of cellular base station antennas.

While the low-PIM embodiments of the present invention can be utilized in any desired location, they are particularly effective for mitigating PIM interference when deployed in the potential PIM reactive zone 235 near the base station antenna 231. Although PIM generation is a function of the antenna broadcast frequency and power, technicians may use a standard distance, such as 10-feet from the antenna 231, to establish the potential PIM reactive zone 235 where PIM mitigation is appropriate. As other options, the potential PIM reactive zone 235 may be established to be a function of the antenna broadcast frequency, such as one or two wavelengths of the main beam frequency channel 233 of the antenna 231. Other factors, such as the broadcast power of the antenna 231, the presence of reflective surfaces in the physical environment of the antenna, the width of the uplink channel, the use of electronic filtering, and other relevant factors may also be taken into account when establishing the potential PIM reactive zone for a particular antenna. For administrative simplicity, however, the size of a PIM reactive zone 235 may ultimately be defined to be a set distance, such as 10-feet from the antenna.

Although particular aspects of the present subject matter have been shown and described in detail, it will be apparent to those skilled in the art that, based upon the teachings of this disclosure, changes and modifications may be made without departing from the subject matter described in this disclosure and its broader aspects and, therefore, the appended claims are to encompass within their scope all such changes and modifications as are within the true spirit and scope of the subject matter described in this disclosure. Although particular embodiments of this disclosure have been illustrated, it is apparent that various modifications and embodiments of the disclosure may be made by those skilled in the art without departing from the scope and spirit of the disclosure. It will therefore be appreciated that the present invention provides significant improvements. The foregoing relates only to the exemplary embodiments of the present invention, and that numerous changes may be made therein without departing from the spirit and scope of the invention as defined by the following claims.

The invention claimed is:

1. A low-PIM mounting block formed of a polymeric material, comprising:
- an anchor block comprising a receptacle for removably attaching another item to the anchor block;
- a dual-adapter base integrally formed with the anchor block;
- one or more cable tie slots for attaching the mounting block to a support structure with cable ties or pipe clamps;
- wherein the dual-adapter base comprises a pole adapter for removably attaching the dual-adapter base to poles having different diameters;
- wherein the dual-adapter base further comprises a flange adapter for removably attaching the dual-adapter base to flanges having different gauges; and
- wherein the flange adapter further comprises a flange slot for straddling a received flange with a first elongated side of the flange slot in contact with a first elongated side of the flange, and with a second elongated side of the flange slot in contact with a second elongated side of the flange.

2. The low-PIM mounting block of claim 1, wherein the pole adapter comprises a pair of spaced-apart pole interface surfaces.

3. The low-PIM mounting block of claim 2, wherein the flange adapter further comprises a pair of flange slots for straddling the received flange positioned between the spaced-apart pole interface surfaces.

4. The low-PIM mounting block of claim 1, wherein the receptacle for removably attaching another item to the anchor block comprises a cable hanger receptacle, a rod receptacle, or a pilot hole receptacle.

5. The low-PIM mounting block of claim 1, further comprising a cable tie for extending through the one or more cable tie slots and around the received flange for securing the anchor block to the received flange.

6. The low-PIM mounting block of claim 5:
- wherein the flange slot is further configured for receiving a first flange having a first gauge snugly within the flange slot with the cable tie following a first cable tie path through the one or more cable tie slots and around the first flange;
- wherein the flange slot is further configured for alternatively receiving a second flange having a second gauge caddy-corner within the flange slot with the cable tie following a second cable tie path through the one or more cable tie slots and around the second flange.

7. The low-PIM mounting block of claim 1, wherein the anchor block comprises a flat mounting plate.

8. The low-PIM mounting block of claim 7, wherein the flat mounting plate further comprises a pair of cable hanger receptacles.

9. The low-PIM mounting block of claim 7, wherein the flat mounting plate further comprises a rod receptacle.

10. The low-PIM mounting block of claim 7, wherein the flat mounting plate further comprises a pair of cable hanger receptacles, and a rod receptacle.

11. A low-PIM mounting system comprising:

one or more low-PIM cable ties or pipe clamps formed of a polymeric material;

a low-PIM mounting block formed of a polymeric material configured for attachment to a support structure by the one or more low-PIM cable ties or pipe clamps;

wherein the low-PIM mounting block further comprises an anchor block comprising a receptacle for removably attaching another item to the anchor block;

wherein the low-PIM mounting block further comprises a dual-adapter base integrally formed with the anchor block, and one or more cable tie slots for attaching the multi-function mounting block to a support structure with cable ties or pipe clamps;

wherein the dual-adapter base further comprises a pole adapter for removably attaching the dual-adapter base to poles having different diameters;

wherein the dual-adapter base further comprises a flange adapter for removably attaching the dual-adapter base to flanges having different gauges; and wherein the flange adapter further comprises a flange slot for straddling a received flange with a first elongated side of the flange slot in contact with a first elongated side of the flange, and with a second elongated side of the flange slot in contact with a second elongated side of the flange.

12. The low-PIM mounting system of claim 11, wherein the pole adapter comprises a pair of spaced-apart pole interface surfaces.

13. The low-PIM mounting system of claim 12, wherein the flange adapter comprises a pair of flange slots for straddling the received flange positioned between the spaced-apart pole interface surfaces.

14. The low-PIM mounting system of claim 11, wherein the receptacle for removably attaching another item to the anchor block comprises a cable hanger receptacle, a rod receptacle, or a pilot hole receptacle.

15. The low-PIM mounting system of claim 11, wherein the one or more low-PIM cable ties or pipe clamps comprises a cable tie for extending through the one or more cable tie slots and around the received flange for securing the anchor block to the received flange.

16. The low-PIM mounting system of claim 15, wherein the flange slot is further configured for receiving a first flange having a first gauge snugly within the flange slot with the cable tie following a first cable tie path through the one or more cable tie slots and around the first flange;

wherein the flange slot is further configured for alternatively receiving a second flange having a second gauge caddy-corner within the flange slot with the cable tie following a second cable tie path through the one or more cable tie slots and around the second flange.

17. The low-PIM mounting system of claim 11, wherein the anchor block comprises a flat mounting plate.

18. The low-PIM mounting system of claim 17, wherein the flat mounting plate comprises a pair of cable hanger receptacles.

19. The low-PIM mounting system of claim 17, wherein the flat mounting plate comprises a rod receptacle.

20. The low-PIM mounting system of claim 17, wherein the flat mounting plate comprises a pair of cable hanger receptacles, and a rod receptacle.

* * * * *